US012009899B2

(12) United States Patent
Li et al.

(10) Patent No.: US 12,009,899 B2
(45) Date of Patent: Jun. 11, 2024

(54) REPORTING RANK INDICATION AND LAYER-SPECIFIC COEFFICIENT QUANTITIES FOR TYPE II CHANNEL STATE INFORMATION (CSI) COMPRESSION USING TWO-PART CSI

(71) Applicant: QUALCOMM Incorporated, San Diego, CA (US)

(72) Inventors: Qiaoyu Li, Beijing (CN); Liangming Wu, Beijing (CN); Chenxi Hao, Beijing (CN); Yu Zhang, Beijing (CN); Chao Wei, Beijing (CN); Hao Xu, Beijing (CN); Parisa Cheraghi, Cambridge (GB); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/310,444

(22) PCT Filed: Feb. 4, 2020

(86) PCT No.: PCT/CN2020/074255
§ 371 (c)(1),
(2) Date: Aug. 3, 2021

(87) PCT Pub. No.: WO2020/160700
PCT Pub. Date: Aug. 13, 2020

(65) Prior Publication Data
US 2022/0131589 A1 Apr. 28, 2022

(30) Foreign Application Priority Data

Feb. 6, 2019 (WO) ................ PCT/CN2019/074727

(51) Int. Cl.
*H04B 7/0417* (2017.01)
*H04B 7/06* (2006.01)

(52) U.S. Cl.
CPC ......... *H04B 7/0658* (2013.01); *H04B 7/0626* (2013.01); *H04B 7/063* (2013.01)

(58) Field of Classification Search
CPC .. H04B 7/0417; H04B 7/0478; H04B 7/0486; H04B 7/0626; H04B 7/063;
(Continued)

(56) References Cited

U.S. PATENT DOCUMENTS 10,848,224 B2 * 11/2020 Park ..................... H04B 7/0639
10,873,439 B2 * 12/2020 Onggosanusi ........ H04W 72/21
(Continued)

FOREIGN PATENT DOCUMENTS

CN 108111199 A 6/2018
WO 2018097600 A1 5/2018
(Continued)

OTHER PUBLICATIONS

CATT: "Remaining Details on CSI Reporting," R1-1720181, 3GPP TSG RAN WG1 Meeting 91, Reno, USA, Nov. 27-Dec. 1, 2017, 4 Pages.
(Continued)

*Primary Examiner* — Frank Duong
(74) *Attorney, Agent, or Firm* — QUALCOMM Incorporated

(57) ABSTRACT

Various aspects of the present disclosure generally relate to wireless communication. In some aspects, a user equipment may transmit, in a first part of two-part channel state information (CSI), a rank indication (RI) and an indication of one or more numbers of first transfer domain coefficients to be used to characterize compressed CSI for one or more layers; and transmit, in a second part of the two-part CSI, an
(Continued)

indication of one or more numbers of second transfer domain coefficients to be used to characterize compressed CSI for one or more beams for the one or more layers. Numerous other aspects are provided.

31 Claims, 14 Drawing Sheets

(58) Field of Classification Search
CPC .. H04B 7/0634; H04B 7/0636; H04B 7/0658; H04B 17/345; H04L 1/0026; H04L 1/0029; H04L 5/0005; H04L 5/0064; H04L 5/0057; H04L 5/0098; H04W 72/0453; H04W 72/046; H04W 72/542; H04W 72/56; Y02D 30/70
See application file for complete search history.

(56) References Cited

U.S. PATENT DOCUMENTS

| | | | |
|---|---|---|---|
| 11,528,116 B2* | 12/2022 | Song | H04W 24/10 |
| 2018/0145737 A1 | 5/2018 | Rahman et al. | |
| 2018/0152858 A1* | 5/2018 | Chen | H04B 7/0636 |
| 2018/0175993 A1 | 6/2018 | Onggosanusi et al. | |
| 2018/0198561 A1* | 7/2018 | Tsai | H04L 27/3488 |
| 2018/0212656 A1* | 7/2018 | Zhao | H04L 1/06 |
| 2018/0278315 A1 | 9/2018 | Wu et al. | |
| 2019/0280750 A1* | 9/2019 | Rahman | H04L 25/03923 |
| 2020/0220598 A1* | 7/2020 | Zhang | H04W 24/08 |
| 2021/0409991 A1* | 12/2021 | Park | H04B 7/0695 |
| 2022/0006496 A1* | 1/2022 | Park | H04W 72/23 |

FOREIGN PATENT DOCUMENTS

| | | |
|---|---|---|
| WO | 2018111007 A1 | 6/2018 |
| WO | 2018142204 A1 | 8/2018 |
| WO | 2018171662 A1 | 9/2018 |
| WO | 2018229078 A1 | 12/2018 |
| WO | 2019017751 A1 | 1/2019 |

OTHER PUBLICATIONS

International Search Report and Written Opinion—PCT/CN2019/074727—ISA/EPO—dated Oct. 29, 2019.
International Search Report and Written Opinion—PCT/CN2020/074255—ISA/EPO—dated Apr. 23, 2020.
Nokia, et al., "Remaining Details for Type I and Type II CSI Reporting," 3GPP Draft, R1-1800754, 3GPP TSG RAN WG1 Meeting AH 1801, 3rd Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 13, 2018 (Jan. 13, 2018), XP051385065, 6 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] sections 2-3.
CATT: "Discussions on Type II CSI Enhancement", 3GPP Draft, 3GPP TSG RAN WG1 Ad-Hoc Meeting 1901, R1-1900338, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593252, 16 Pages, Section 1, p. 1 Section 2.4.2, p. 13-p. 15, figure 6.
ERICSSON: "On K0 Coefficient Subset Selection for Type II Overhead Reduction", 3GPP Draft, 3GPP TSG RAN WG1 Meeting Ad-Hoc Meeting 1901, R1-1900756, 3rd Generation Partnership Project (3GPP), Mobile Competence Centre, 650, Route Des Lucioles, F-06921 Sophia-Ant, vol. RAN WG1, No. Taipei, Taiwan, Jan. 21, 2019-Jan. 25, 2019, Jan. 20, 2019 (Jan. 20, 2019), XP051593603, 7 Pages, Section 1, p. 1 Section 2.1, p. 4-p. 6.
Supplementary European Search Report—EP20752948—Search Authority—Munich—dated Sep. 20, 2022.

\* cited by examiner

REPORTING RANK INDICATION AND LAYER-SPECIFIC COEFFICIENT QUANTITIES FOR TYPE II CHANNEL STATE INFORMATION (CSI) COMPRESSION USING TWO-PART CSI

CROSS-REFERENCE TO RELATED APPLICATIONS

This application is a 371 national stage of Patent Cooperation Treaty (PCT) Application No. PCT/CN2020/074255 filed on Feb. 4, 2020, entitled "REPORTING RANK INDICATION AND LAYER-SPECIFIC COEFFICIENT QUANTITIES FOR TYPE II CHANNEL STATE INFORMATION (CSI) COMPRESSION USING TWO-PART CSI," which claims priority to PCT Application No. PCT/CN2019/074727, filed on Feb. 6, 2019, entitled "REPORTING RANK INDICATION AND LAYER-SPECIFIC COEFFICIENT QUANTITIES FOR TYPE II CHANNEL STATE INFORMATION (CSI) COMPRESSION USING TWO-PART CSI," which are hereby expressly incorporated by reference herein.

FIELD OF THE DISCLOSURE

Aspects of the present disclosure generally relate to wireless communication and to techniques and apparatuses for reporting rank indication (RI) and layer-specific coefficient quantities for Type II channel state information (CSI) compression using two-part CSI.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, an eNodeB, an eNB, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

A UE may report channel state information (CSI) feedback for multiple layers to support multiple input multiple output (MIMO) communications. In this case, the UE may generate a transfer domain (TD) coefficient matrix for each layer and may report non-zero coefficients from the TD coefficient matrix for each layer. However, different layers may have different numbers (quantities) of non-zero (for example, dominant) coefficients in respective TD coefficient matrices. Because different layers may be associated with different numbers of first TD coefficients (for example, non-zero or dominant coefficients in the TD coefficient matrix) to characterize compressed CSI, the UE may need to indicate, to a base station, the quantity of first TD coefficients to be reported by the UE for each layer. The UE may also need to indicate, to the base station, for each layer, a quantity of second TD coefficients to be reported by the UE for each beam (for example, in a spatial domain (SD) compression matrix). Without such reporting, for example, if the same number of first TD coefficients and/or second TD coefficients are assumed and/or used for each layer, compression of CSI may result in less accurate beam configuration. However, a payload of such reported information (for example, reported in CSI) may vary in size in different scenarios. As a result, the UE may need to indicate a size of the dynamic payload to the base station so that the base station can properly interpret the information received from the UE for proper beam configuration.

SUMMARY

In some aspects, a method of wireless communication, performed by a user equipment (UE), may include transmitting, in a first part of two-part channel state information (CSI), a rank indication (RI) and an indication of one or more numbers of first transfer domain coefficients to be used to characterize compressed CSI for one or more layers; and transmitting, in a second part of the two-part CSI, an indication of one or more numbers of second transfer domain coefficients to be used to characterize compressed CSI for one or more beams for the one or more layers.

In some aspects, a UE for wireless communication may include memory and one or more processors operatively coupled to the memory. The memory and the one or more processors may be configured to transmit, in a first part of two-part CSI, an RI and an indication of one or more numbers of first transfer domain coefficients to be used to characterize compressed CSI for one or more layers; and transmit, in a second part of the two-part CSI, an indication of one or more numbers of second transfer domain coefficients to be used to characterize compressed CSI for one or more beams for the one or more layers.

In some aspects, a non-transitory computer-readable medium may store one or more instructions for wireless communication. The one or more instructions, when executed by one or more processors of a UE, may cause the one or more processors to: transmit, in a first part of two-part CSI, an RI and an indication of one or more numbers of first transfer domain coefficients to be used to characterize compressed CSI for one or more layers; and transmit, in a second part of the two-part CSI, an indication of one or more numbers of second transfer domain coefficients to be used to characterize compressed CSI for one or more beams for the one or more layers.

In some aspects, an apparatus for wireless communication may include means for transmitting, in a first part of two-part CSI, an RI and an indication of one or more numbers of first transfer domain coefficients to be used to characterize compressed CSI for one or more layers; and means for transmitting, in a second part of the two-part CSI, an indication of one or more numbers of second transfer domain coefficients to be used to characterize compressed CSI for one or more beams for the one or more layers.

In some aspects, a method of wireless communication, performed by a base station, may include receiving, in a first part of two-part CSI, an RI and an indication of one or more numbers of first transfer domain coefficients to be used to characterize compressed CSI for one or more layers; and receiving, in a second part of the two-part CSI, an indication of one or more numbers of second transfer domain coefficients to be used to characterize compressed CSI for one or more beams for the one or more layers.

In some aspects, a base station for wireless communication may include memory and one or more processors operatively coupled to the memory. The memory and the one or more processors may be configured to receive, in a first part of two-part CSI, an RI and an indication of one or more numbers of first transfer domain coefficients to be used to characterize compressed CSI for one or more layers; and receive, in a second part of the two-part CSI, an indication of one or more numbers of second transfer domain coefficients to be used to characterize compressed CSI for one or more beams for the one or more layers.

In some aspects, a non-transitory computer-readable medium may store one or more instructions for wireless communication. The one or more instructions, when executed by one or more processors of a base station, may cause the one or more processors to: receive, in a first part of two-part CSI, an RI and an indication of one or more numbers of first transfer domain coefficients to be used to characterize compressed CSI for one or more layers; and receive, in a second part of the two-part CSI, an indication of one or more numbers of second transfer domain coefficients to be used to characterize compressed CSI for one or more beams for the one or more layers.

In some aspects, an apparatus for wireless communication may include means for receiving, in a first part of two-part CSI, an RI and an indication of one or more numbers of first transfer domain coefficients to be used to characterize compressed CSI for one or more layers; and means for receiving, in a second part of the two-part CSI, an indication of one or more numbers of second transfer domain coefficients to be used to characterize compressed CSI for one or more beams for the one or more layers.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
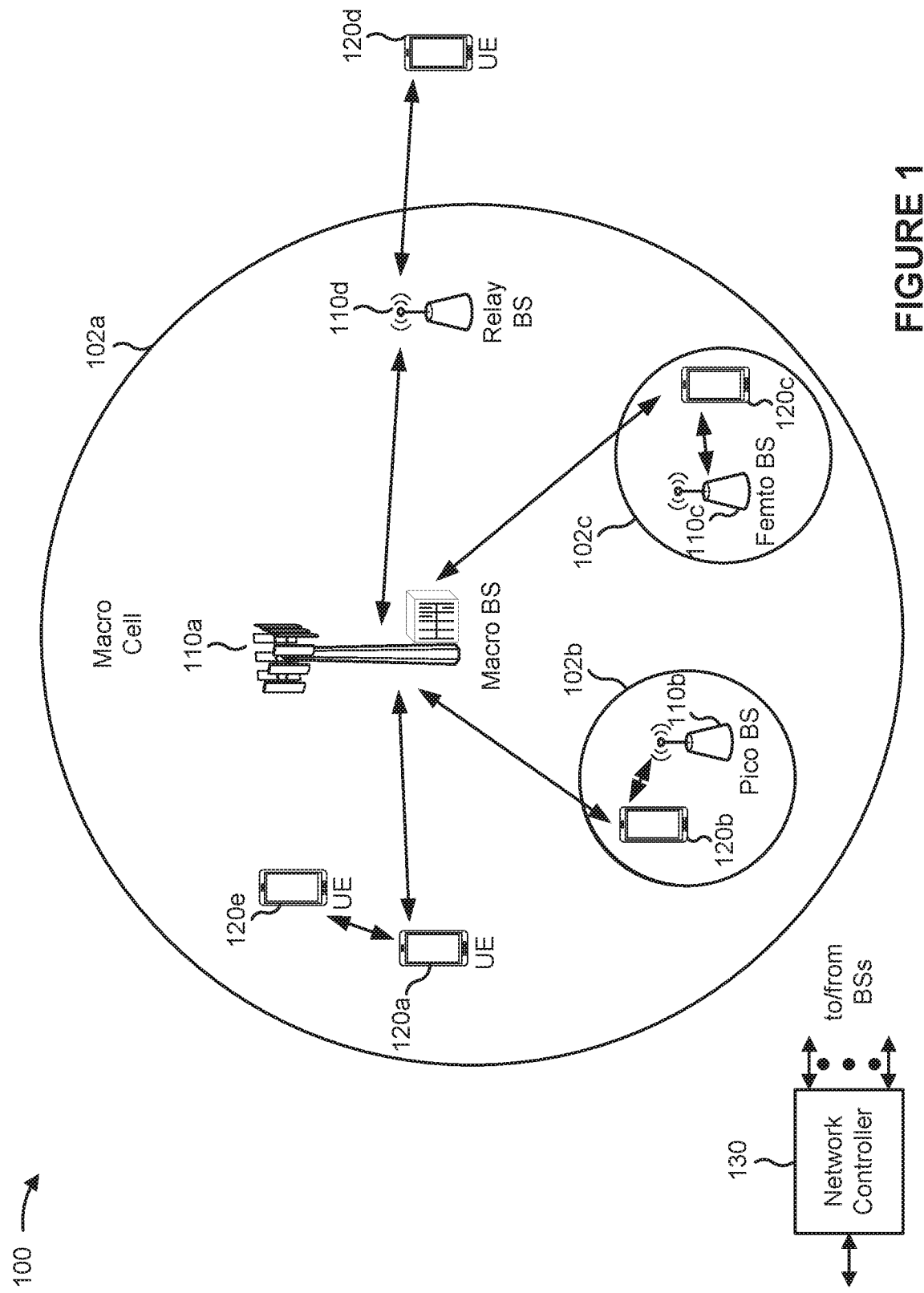
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including New Radio (NR) technologies.

Some techniques and apparatuses described herein enable a user equipment (UE) to report a rank indication (RI), layer-specific coefficient quantities (for example, an indication of a number of coefficients that the UE reports for each layer), and/or beam-specific coefficient quantities (for example, an indication, for each beam of each layer, of a number of coefficients that the UE reports for the respective beam) using two-part channel state information (CSI). In two-part CSI, a first part of the two-part CSI may have a fixed payload size, and a second part of the two-part CSI may have a dynamic payload size, the size of which may be indicated in the first part of the two-part CSI. In this way, the UE may report different numbers of first TD coefficients for different layers and different numbers of corresponding second TD coefficients for each beam, and the base station may interpret received CSI according to the payload size indicated by the UE. Furthermore, some techniques and apparatuses described herein permit such reporting with low overhead.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a number of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), and/or the like (these terms are used interchangeably herein). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, and/or the like. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not necessarily be stationary, rather, the geographic area of the cell may move in accordance with the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

UEs 120 (for example, 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be or may include a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies or frequency channels. A frequency may also be referred to as a carrier and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Figure 2:
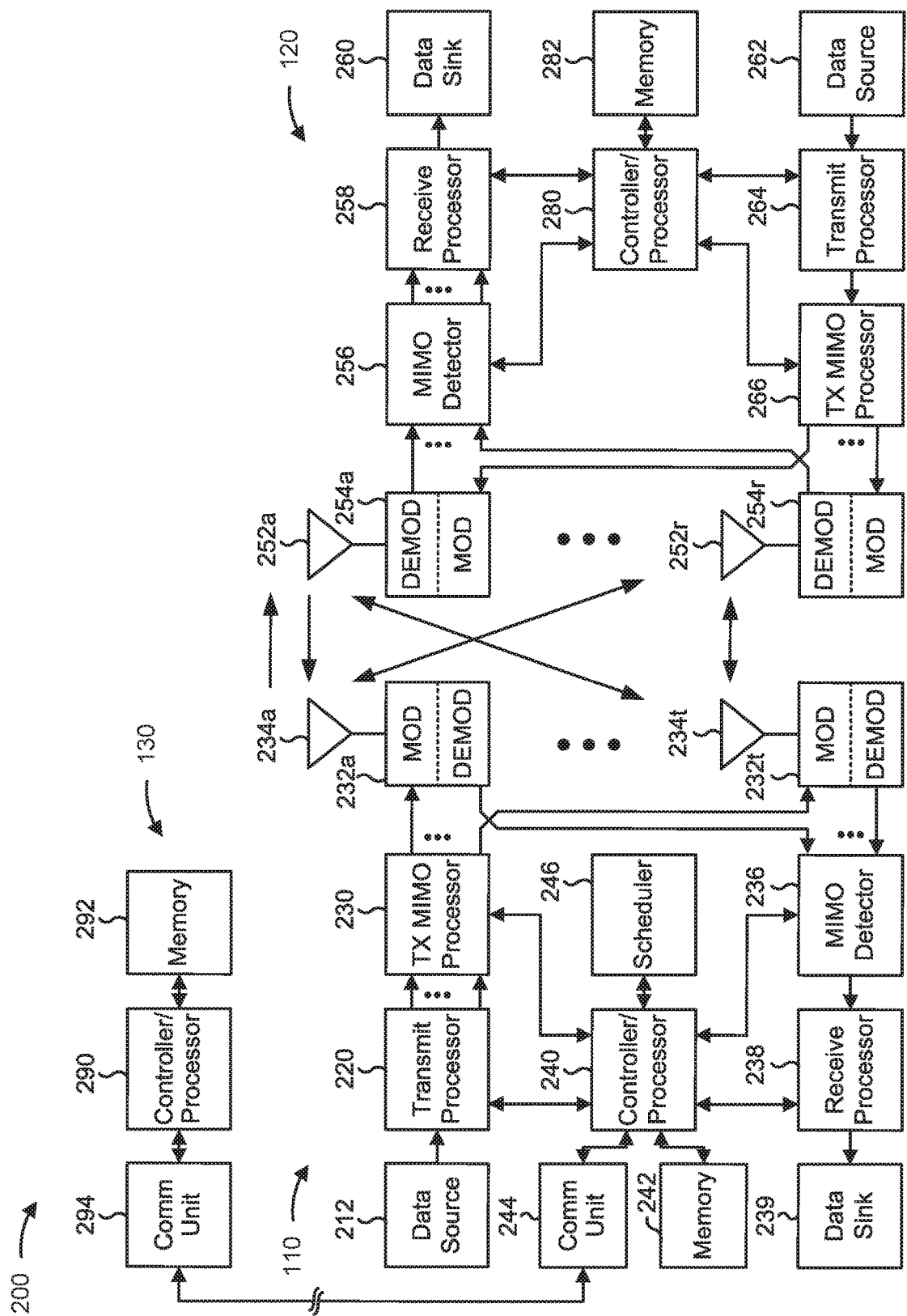
FIG. 2 is a block diagram illustrating an example base station (BS) in communication with a user equipment (UE) in a wireless network in accordance with various aspects of the present disclosure.

FIG. 2 is a block diagram 200 illustrating an example BS in communication with a UE in a wireless network in accordance with various aspects of the present disclosure.

Base station 110 may be equipped with T antennas 234*a* through 234*t*, and UE 120 may be equipped with R antennas 252*a* through 252*r*, where in general T>1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) and/or the like) and control information (for example, CQI requests, grants, upper layer signaling, and/or the like) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232*a* through 232*t*. Each MOD 232 may process a respective output symbol stream (for example, for OFDM and/or the like) to obtain an output sample stream. Each MOD 232 may further process (for example, convert to analog, amplify, filter, and upconvert) the respective output sample stream to generate a downlink signal. The T downlink signals generated by MODs 232*a* through 232*t* may be transmitted via T antennas 234*a* through 234*t*, respectively. In accordance with various aspects described in more detail below, the synchronization signals can be generated with location encoding to convey additional information.

At UE 120, antennas 252*a* through 252*r* may receive the T downlink signals from base station 110 and/or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM and/or the like) to obtain received symbols. A MIMO detector 256 may obtain received symbols from all R DEMODs 254*a* through 254*r*, and perform MIMO detection on the received symbols, if applicable, to provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), and/or the like. In some aspects, one or more of these or other components of UE 120 may be included in a portable housing.

On the uplink, at UE 120, a transmit processor 264 may receive and process data from a data source 262 as well as control information (for example, for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), orthogonal frequency division multiplexing (OFDM) with a cyclic prefix (CP) (CP-OFDM), and/or the like), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more operations associated with reporting rank indication and layer-specific coefficient quantities for Type II channel state information (CSI) compression using two-part CSI, as described with reference to FIGS. 5-8. For example, controller/processor 240 of base station 110, controller/processor 280 of UE 120, and/or any other component(s) of FIG. 2 may perform, or direct the performance of, operations associated with, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting, in a first part of two-part CSI, an RI and an indication of one or more numbers of first transfer domain coefficients to be used to characterize compressed CSI for one or more layers; means for transmitting, in a second part of the two-part CSI, an indication of one or more numbers of second transfer domain coefficients to be used to characterize compressed CSI for one or more beams for the one or more layers; among other examples. In some aspects, such means may include one or more components of UE 120 described in connection with FIG. 2.

In some aspects, base station 110 may include means for receiving, in a first part of two-part CSI, an RI and an indication of one or more numbers of first transfer domain coefficients to be used to characterize compressed CSI for one or more layers; means for receiving, in a second part of the two-part CSI, an indication of one or more numbers of second transfer domain coefficients to be used to characterize compressed CSI for one or more beams for the one or more layers; among other examples. In some aspects, such means may include one or more components of base station 110 described in connection with FIG. 2.

Figure 3:
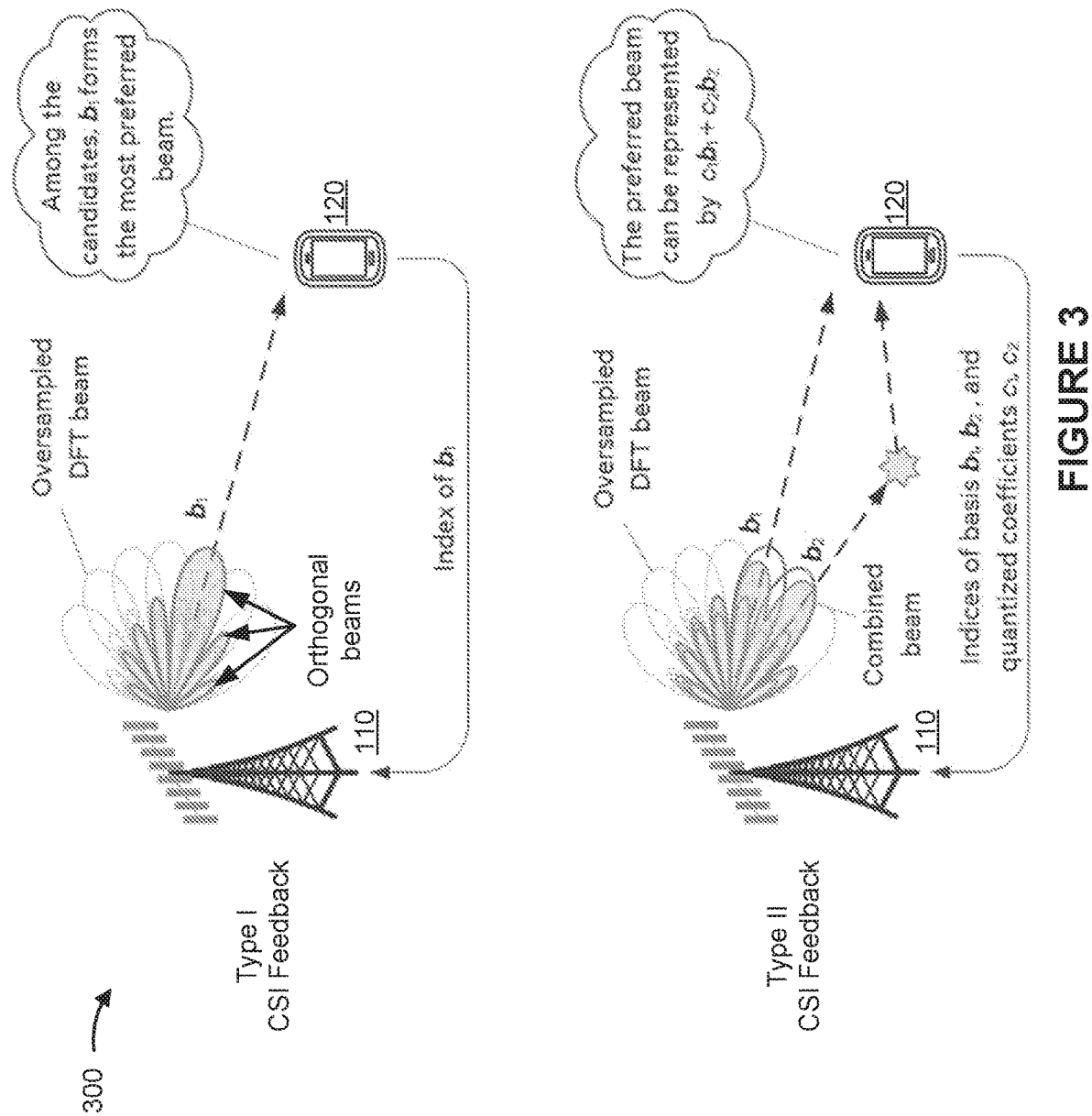
FIG. 3 is a diagram illustrating an example of Type I channel state information (CSI) feedback and Type II CSI feedback in accordance with various aspects of the present disclosure.

FIG. 3 is a diagram 300 illustrating an example of Type I CSI feedback and Type II CSI feedback in accordance with various aspects of the present disclosure. As shown in FIG. 3, for Type I CSI feedback, a codebook for CSI may define a set of discrete Fourier transform (DFT) beams in the spatial domain. In some aspects, each beam in the set of beams is orthogonal with the other beams in the set of beams. In some aspects, a beam may be represented by a DFT vector, and/or may be identified by a beam index (for example, $b_1$, $b_2$, and so on). A base station 110 may transmit CSI reference signals (CSI-RSs) for the set of beams in the codebook, and a UE 120 may measure the CSI-RS for a set of candidate beams (for example, one or more beams in the codebook). The UE 120 may select the best beam or a set of best beams among the set of candidate beams (shown as $b_1$ in FIG. 3) based at least in part on the measurements. The UE 120 may transmit CSI feedback (for example, in a CSI report) to indicate the selected beam(s) to the base station 110. For example, the selected beam(s) may be indicated using a precoding matrix indicator (PMI). However, using Type I CSI feedback may limit the spatial resolution of beams (for example, candidate beams may be limited to the beams in the codebook) and may result in selection of a worse beam than could otherwise be used (for example, by linearly combining multiple DFT vectors corresponding to different beams, as described below). The UE 120 and the base station 110 may use the selected beam or a beam selected from the set of beams to communicate.

As further shown in FIG. 3, for Type II CSI feedback, a codebook for CSI may include multiple oversampled DFT beams, which may not all be orthogonal with one another. In some aspects, the beams included in the codebook may be separated into multiple groups of orthogonal beams. The UE 120 may measure CSI-RSs, may select a group (for example, the best group) based at least in part on the measurements, and may analyze different linear combinations of two or more beams in the group. The UE 120 may determine whether any of the linear combinations form a beam with better spatial resolution than a single beam in the group. If so, the UE 120 may transmit CSI feedback (for example, in a CSI report) that indicates the beam indexes of the selected beams to be combined (shown as $b_1$ and $b_2$ in FIG. 3) and the linear combination coefficients (shown as $c_1$ for beam $b_1$ and $c_2$ for beam $b_2$ in FIG. 3) to be applied to each selected beam to form the beam with the better spatial resolution. The UE 120 and/or the base station 110 may configure a beam using the indicated beam indexes and linear combination coefficients (sometimes referred to herein as "coefficients"), and may communicate via the configured beam.

In some aspects, the UE 120 may report CSI feedback for multiple sub-bands (for example, each sub-band via which the UE 120 is capable of communicating with the base station 110). In this case, the UE 120 may report beam indexes and corresponding coefficients for multiple sub-bands (for example, each sub-band). In some aspects, the beam indexes may be common across sub-bands, but different sub-bands may be associated with different coefficients (for example, different amplitude coefficients, different phase coefficients, and/or the like). As a result, Type II CSI feedback may consume more overhead than Type I CSI feedback, but may result in a better beam used for communications, thereby resulting in higher throughput, lower latency, less likelihood of beam failure, and/or the like. To reduce the overhead used for Type II CSI feedback, the UE 120 and/or the base station 110 may employ Type II CSI compression, as described below in connection with FIG. 4.

Figure 4:
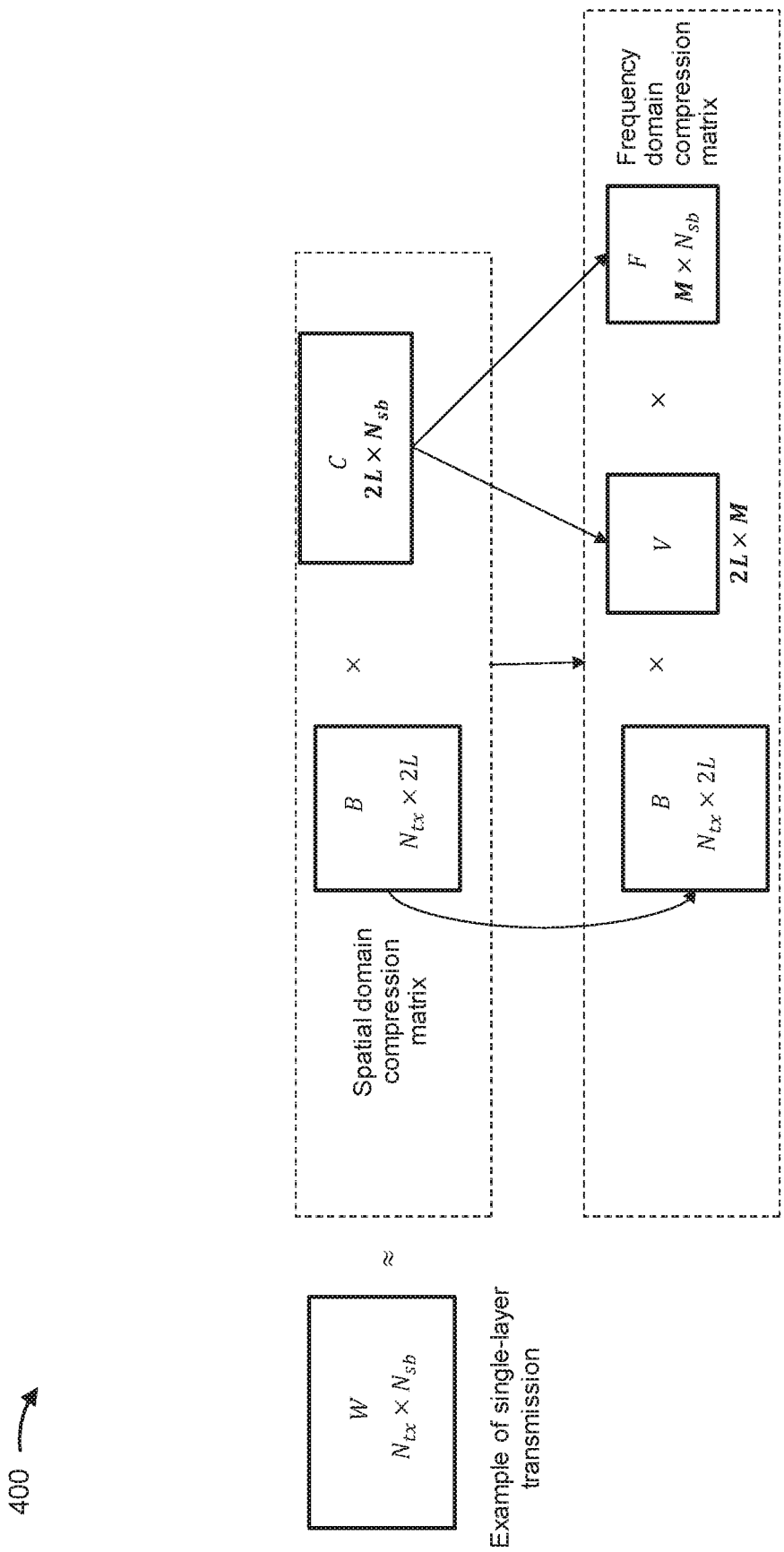
FIG. 4 is a diagram illustrating an example of Type II CSI compression in accordance with various aspects of the present disclosure.

FIG. 4 is a diagram 400 illustrating an example of Type II CSI compression in accordance with various aspects of the present disclosure. As shown in FIG. 4, using conventional techniques, the UE 120 may apply transfer domain (TD) compression to the CSI feedback to reduce the overhead of Type II CSI feedback. For example, using conventional techniques, a precoding matrix W may be represented by a spatial domain (SD) compression matrix B multiplied by a frequency domain coefficient matrix C, which may be used by a UE 120 to report a linear combination of DFT beams for a particular sub-band, and corresponding coefficients for multiple sub-bands or frequencies, as described above in connection with FIG. 3. The frequency domain coefficient matrix C may have a size based at least in part on a number of beams for which CSI is to be reported (for example, L beams, with 2 polarizations per beam, for a total of 2L beams) and a number of sub-bands for which CSI is to be reported ($N_{sb}$). Reporting values of frequency domain coefficient matrix C may result in significant overhead, especially when the number of sub-bands ($N_{sb}$) is large.

In some aspects, to apply compression and reduce overhead, the UE 120 may transfer the frequency domain coefficient matrix C into a TD coefficient matrix V multiplied by a frequency domain compression matrix F. The frequency domain compression matrix F may represent the frequencies or sub-bands for which CSI is to be reported, and the size of the frequency domain compression matrix F may be based at least in part on a number of TD bases M and the number of sub-bands $N_{sb}$.

The TD coefficient matrix V may represent coefficients in a transfer domain, which may be transferred from the frequency domain represented in frequency domain coefficient matrix C, such as by applying DFT, discrete cosine transform (DCT), inverse fast Fourier transform (IFFT), or another transform function to the frequency domain coefficient matrix C. The size of the TD coefficient matrix V may be based at least in part on a number of beams for which CSI is to be reported (for example, L beams, with 2 polarizations per beam, for a total of 2L beams) and a number of TD bases M (for example, used when applying the transform function).

In some aspects, the coefficients in the TD coefficient matrix V may represent the time domain taps (for example, channel taps, which may represent a time delay of a signal) of the coefficients in frequency domain coefficient matrix C. In some cases, the channel characteristics in the time domain may be sparse. In this case, the number of non-zero coefficients (for example, dominant coefficients) in the TD coefficient matrix V may be sparse. In some aspects, the UE 120 may report a limited number of non-zero coefficients, for each beam, included in the TD coefficient matrix V, thereby compressing the Type II CSI feedback and reducing overhead in Type II CSI feedback as compared to reporting frequency domain coefficient matrix C.

In some aspects, the UE 120 may report CSI feedback for multiple layers (for example, multiple MIMO layers) to support MIMO communications. In this case, the UE 120 may generate a TD coefficient matrix V for each layer (for example, based at least in part on measuring CSI-RSs), and may report non-zero coefficients from the TD coefficient matrix V for each layer. However, different layers may have different numbers (quantities) of non-zero (for example, dominant) coefficients in respective TD coefficient matrices. For example, leading layers associated with stronger channel gains may require a smaller number of non-zero coefficients to characterize CSI feedback (for example, PMI, a PMI matrix, and/or the like) in the transfer domain because a dominant tap may be associated with a smaller number of beams for a leading layer (for example, when frequency selectivity for the layer is low). Conversely, later layers associated with weaker channel gains may require a larger number of non-zero coefficients to characterize CSI in the transfer domain because a dominant tap may be associated with a larger number of beams for a later layer (for example, when frequency selectivity for the layer is high).

Because different layers may be associated with different numbers of first TD coefficients (for example, non-zero or dominant coefficients in the TD coefficient matrix V) to characterize compressed CSI, the UE 120 may need to indicate, to a base station 110, the quantity of first TD coefficients to be reported by the UE 120 for each layer. The UE 120 may also need to indicate, to the base station 110, for each layer, a quantity of second TD coefficients to be reported by the UE 120 for each beam (for example, in the SD compression matrix B). Without such reporting, for example, if the same number of first TD coefficients and/or second TD coefficients are assumed and/or used for each layer, compression of CSI may result in less accurate beam configuration (for example, less accurate beam construction from multiple DFT beams and corresponding coefficients, reported as first TD coefficients).

However, a payload of such reported information (for example, reported in CSI) may vary in size in different scenarios. For example, the number of layers for which the UE 120 reports corresponding numbers of first TD coefficients may depend on an RI value (which indicates, for example, a number of layers to be used by the UE 120). Additionally, the numbers of first TD coefficients used for each layer may depend on a maximum total number of first TD coefficients permitted to be used by the UE 120 for all layers. The number of first TD coefficients used for a given layer also may depend on a maximum number of first TD coefficients permitted to be used by the UE 120 for that layer. Furthermore, a number of second TD coefficients may depend on the number of layers (for example, where second TD coefficients are reported for each layer), and/or the like. As a result, the UE 120 may need to indicate a size of the dynamic payload to the base station 110 so that the base station 110 can properly interpret the information received from the UE 120 for proper beam configuration.

Some techniques and apparatuses described herein enable a UE 120 to report an RI, layer-specific coefficient quantities (for example, an indication of a number of coefficients that the UE 120 reports for each layer), and/or beam-specific coefficient quantities (for example, an indication, for each beam of each layer, of a number of coefficients that the UE 120 reports for the respective beam) using two-part CSI. In two-part CSI, a first part of the two-part CSI may have a fixed payload size, and a second part of the two-part CSI may have a dynamic payload size, the size of which may be indicated in the first part of the two-part CSI. In this way, the UE 120 may report different numbers of first TD coefficients for different layers and different numbers of corresponding second TD coefficients for each beam, and the base station 110 may interpret received CSI according to the payload size indicated by the UE 120. Furthermore, some techniques and apparatuses described herein permit such reporting with low overhead. Additional details are described below.

Figure 5:
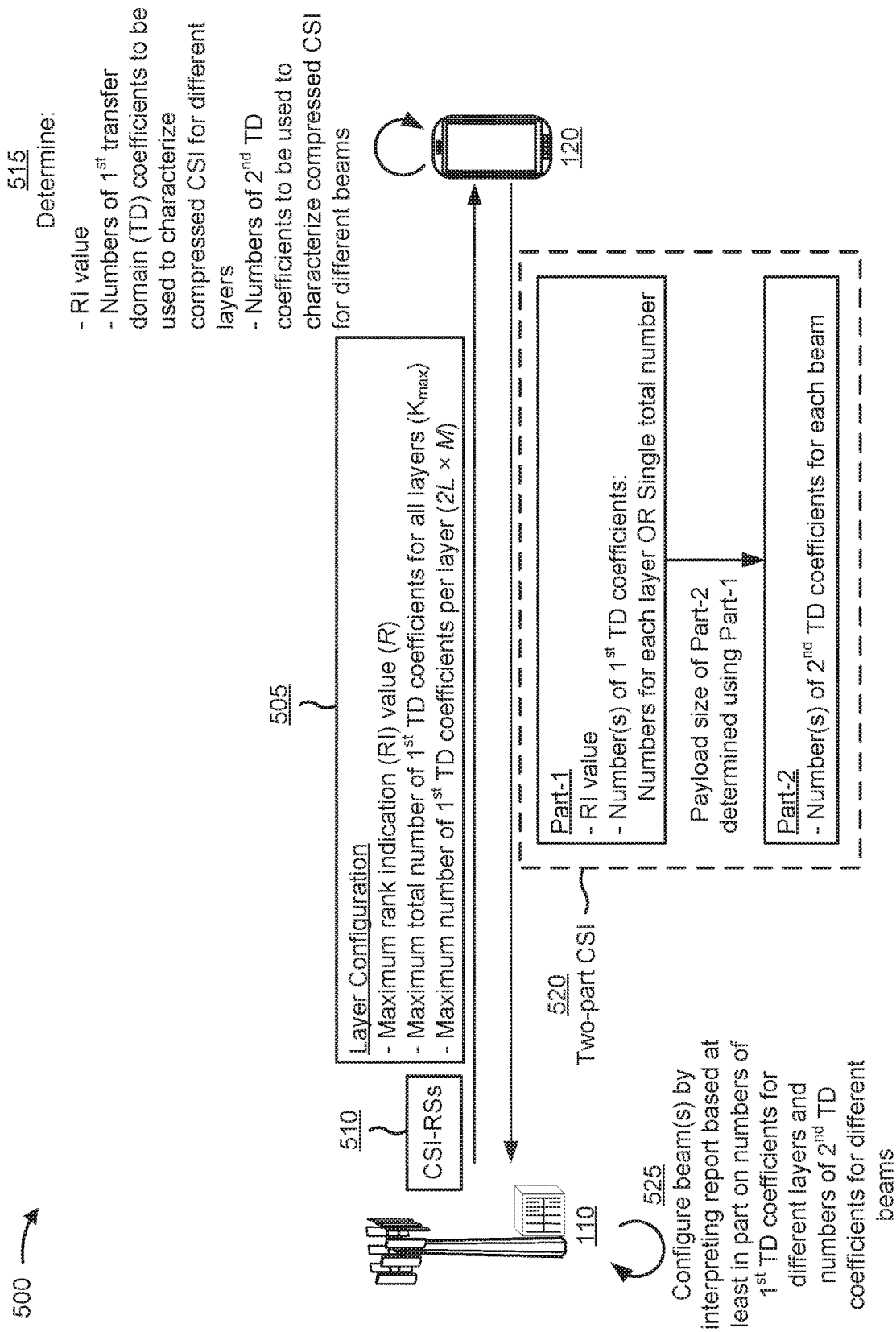
FIGS. 5-8 are diagrams illustrating examples of reporting rank indication and layer-specific coefficient quantities for Type II CSI compression using two-part CSI in accordance with various aspects of the present disclosure.

FIG. 5 is a diagram 500 illustrating an example of reporting rank indication and layer-specific coefficient quantities for Type II CSI compression using two-part CSI in accordance with various aspects of the present disclosure.

In a first operation 505, a base station 110 may transmit, and a UE 120 may receive, a layer configuration. In some aspects, the layer configuration may indicate a maximum RI value permitted to be used by the UE 120, shown as R. The maximum RI value may indicate a maximum number of layers permitted for communications between the UE 120 and the base station 110. Additionally or alternatively, the layer configuration may indicate a maximum total number of first TD coefficients permitted to be used by the UE 120 across all layers, shown as $K_{max}$. This maximum total number may represent a maximum that the UE 120 is not permitted to exceed when the numbers of first TD coefficients for each layer are summed (e.g., a maximum total number of first TD coefficients permitted for all layers collectively).

In some aspects, the indication of the maximum total number of first TD coefficients may include an indication of a configured number of first transfer domain coefficients for each layer. In this case, the maximum total number of first TD coefficients is based at least in part on the configured number of first TD coefficients for each layer. For example, if the layer configuration indicates $K_0$ TD coefficients per layer, and the configured number of first TD coefficients is the same for each layer, then the maximum total number of TD coefficients across all layers may be determined by multiplying K0 by a maximum RI. The maximum RI may be based at least in part on a UE capability and/or may be prespecified (for example, according to a wireless communication standard).

In some aspects, the layer configuration may indicate that a total number of actually reported first TD coefficients for all layers collectively (for example, $K_{tot}$) is to be equal to the maximum total number of first TD coefficients across all layers ($K_{max}$). In this case, the UE 120 must use the maximum total number of first TD coefficients ($K_{max}$) when reporting first TD coefficients. For example, when this configuration is enabled, the sum of the number of first TD coefficients used for all layers ($K_{tot}$) must be equal to the maximum total number of first TD coefficients across all layers ($K_{max}$).

Additionally or alternatively, the layer configuration may indicate a maximum number of first TD coefficients per individual layer (for example, for one or more layers, for each layer, and/or the like). In some aspects, the maximum number of first TD coefficients for a layer may be indicated as a number of beams for the layer, shown as 2L (as described above in connection with FIG. 4), and a number of transfer domain bases for the layer, shown as M (as described above in connection with FIG. 4). In this case, the maximum number of first TD coefficients for a layer may be determined by multiplying the number of beams for the layer and the number of transfer domain bases for the layer (shown as 2L×M).

In some aspects, the maximum number of first TD coefficients per layer is the same for each layer. For example, the number of beams and/or the number of transfer domain bases may be the same for each layer. In some aspects, the number of transfer domain bases may be layer-specific, and the base station 110 may indicate the number of transfer domain bases for each layer. In this case, different layers may have the same number of transfer domain bases or different numbers of transfer domain bases, in accordance with the layer configuration indicated by the base station 110. For example, a layer with a greater number of first TD coefficients may be associated with more transfer domain bases, and a layer with a smaller number of first TD coefficients may be associated with fewer transfer domain bases. The UE 120 may use information included in the layer configuration to determine an RI value, numbers of first TD coefficients for each layer, numbers of second TD coefficients for each combination of beam and layer, and/or the like, as described below.

In a second operation 510, the base station 110 may transmit, and the UE 120 may receive, CSI-RSs. As described above in connection with FIG. 3, for Type II CSI feedback, a codebook for CSI may include multiple oversampled DFT beams, which may not all be orthogonal with one another. In some aspects, the beams included in the codebook may be separated into multiple groups of orthogonal beams. The UE 120 may measure CSI-RSs, may select a group (for example, the best group) based at least in part on the measurements, and may analyze different linear combinations of two or more beams in the group. The UE 120 may determine whether any of the linear combinations form a beam with better spatial resolution than a single beam in the group. If so, the UE 120 may transmit CSI feedback (for example, in a CSI report) that indicates the beam indexes of the selected beams to be combined and the linear combination coefficients to be applied to each selected beam to form the beam with the better spatial resolution. In some aspects, the UE 120 may use different numbers of linear combination coefficients for different layers. As described above in connection with FIG. 4, the UE 120 may apply compression when reporting the linear combination coefficients.

In a third operation 515, the UE 120 may determine an RI value, numbers of first TD coefficients to be used to characterize compressed CSI for different layers, and/or numbers of second TD coefficients to be used to characterize compressed CSI for different beams (for example, for each layer). For example, the UE 120 may determine an RI value r based at least in part on measuring the CSI-RS and based at least in part on the maximum RI value (for example, the determined RI value r cannot exceed the maximum RI value R). The determined RI value may indicate the number of layers to be used for communications between the UE 120 and the base station 110.

In some aspects, the UE 120 may determine the numbers of first TD coefficients to be used for different layers based at least in part on the RI value. For example, the RI value may indicate the number of layers, and the UE 120 may determine corresponding numbers of first TD coefficients for each layer (for example, a first number of first TD coefficients to be used for a first layer, a second number of first TD coefficients to be used for a second layer, and so on). Additionally or alternatively, the UE 120 may determine the numbers of first TD coefficients to be used for different layers based at least in part on the maximum total number of first TD coefficients for all layers ($K_{max}$). For example, the total number of first TD coefficients used for all layers cannot exceed the maximum total number of first TD coefficients. In some configurations, the total number of first TD coefficients used for all layers must equal the maximum total number of first TD coefficients, as described above. Additionally or alternatively, the UE 120 may determine the numbers of first TD coefficients to be used for different layers based at least in part on the maximum number of first TD coefficients per layer. For example, the number of first TD coefficients used for a layer cannot exceed the maximum number of first TD coefficients for that layer (2LM). Additionally or alternatively, the UE 120 may determine the numbers of first TD coefficients to be used for a layer based at least in part on a TD coefficient matrix V generated for that layer (for example, based at least in part on a number of non-zero or dominant coefficients in the TD coefficient matrix V), as described above in connection with FIG. 4.

In some aspects, the UE 120 may determine the numbers of second TD coefficients to be used for different beams based at least in part on a number of beams configured for the UE 120 (for example, 2L) and/or based at least in part on the number of layers determined by the UE 120 (for example, the RI value r). For example, the UE 120 may determine respective numbers of second TD coefficients for each combination of beam and layer. For example, a first number of second TD coefficients may be used for a first beam on a first layer, a second number of second TD coefficients may be used for the first beam on a second layer, a third number of second TD coefficients may be used for a second beam on the first layer, a fourth number of second TD coefficients may be used for the second beam on the second layer, and so on.

In a fourth operation 520, the UE 120 may use two-part CSI to transmit, to the base station 110, an indication of an RI value, an indication of the numbers of first TD coefficients to be used to characterize compressed CSI for different layers, and an indication of the numbers of second TD coefficients to be used to characterize compressed CSI for different beams. The UE 120 may use two-part CSI because the number of first TD coefficients and the number of second TD coefficients may vary for different scenarios (for example, for different RI values, for different channel characteristics, for different numbers of beams, and/or the like). The two-part CSI may include a first part (shown as Part-1) with a fixed size and a second part (shown as Part-2) with a dynamic size. In some aspects, the size of the second part of the two-part CSI (for example, a payload size of the second part) may be based at least in part on the indication in the first part. For example, the base station 110 may decode the first part of the two-part CSI, having the fixed size, and may explicitly or implicitly derive the payload size of the second part of the two-part CSI based at least in part on the first part of the two-part CSI. In this way, the UE 120 may use the first part of the two-part CSI to indicate, to the base station 110, the size of the second part of the two-part CSI so that the base station 110 can properly interpret the two-part CSI. Additionally or alternatively, the payload size of the second part of the two-part CSI may be based at least in part on a maximum total number of first transfer domain coefficients for all layers configured for the UE 120 (for example, $K_{max}$, which may dictate the number of first TD coefficients and/or the number(s) of second TD coefficients).

As shown in FIG. 5, the first part of the two-part CSI may include an indication of an RI value and an indication of one or more numbers of first TD coefficients to be used to characterize compressed CSI for one or more layers corresponding to the one or more numbers. In some aspects, the one or more numbers of first TD coefficients may include numbers of first TD coefficients for each layer, as described in more detail below in connection with FIG. 6. In some aspects, the one or more numbers of first TD coefficients may include a single total number of first transfer domain coefficients for all layers, as described in more detail below in connection with FIG. 7 and FIG. 8.

As further shown in FIG. 5, the second part of the two-part CSI may include an indication of one or more numbers of second TD coefficients to be used to characterize compressed CSI for one or more beams corresponding to the one or more numbers. For example, the UE 120 may indicate, for each layer, one or more numbers of second TD coefficients for one or more beams for the layer. Additional details are described below in connection with FIGS. 6-8.

In some aspects, the UE 120 may transmit an indication of a total number of first TD coefficients reported by the UE 120 for all layers collectively. The total number of first TD coefficients may be less than or equal to the maximum total number of first TD coefficients ($K_{max}$). The total number of first TD coefficients may be indicated using one or more bits. A length of the one or more bits may be based on at least one of the maximum total number of coefficients, a configured number of first transfer domain coefficients for each layer, or a maximum RI. For example, the length may be calculated by:

$$\lceil \log_2 K_{max} \rceil$$

Alternatively, the length may be calculated by:

$$\lceil \log_2 K_0 \times MaxRI \rceil$$

In other words, the length of the set of bits may be based at least in part on applying a ceiling function to a binary logarithm of the maximum total number of first TD coefficients. Alternatively, the length of the set of bits may be based at least in part on applying a ceiling function to a binary logarithm of a multiplication produce of a configured number of first TD coefficients per layer and a maximum RI.

In some aspects, the UE 120 may transmit an indication of an average number of first TD coefficients per layer. The average number of first TD coefficients per layer may be less than or equal to a configured number of first transfer domain coefficients per layer (e.g., $K_0$). The indication of the average number of first TD coefficients per layer may include one or more bits. A length of the one or more bits may be based at least in part on at least one of the maximum total number of TD domain coefficients, the configured number of first transfer domain coefficients per layer, or a maximum RI. For example, the length may be calculated by:

$$\lceil \log_2 K_0 \rceil$$

Alternatively, the length may be calculated by:

$$\lceil \log_2 \frac{K\max}{MaxRI} \rceil$$

In other words, the length of the set of bits may be based at least in part on applying a ceiling function to a binary logarithm of the configured number of first TD coefficients per layer ($K_0$). Alternatively, the length of the set of bits may be based at least in part on applying a ceiling function to a binary logarithm of a result of dividing a maximum total number of TD coefficients by a maximum RI.

In some aspects, the UE 120 may transmit, for each layer of a plurality of layers, an indication of the first TD coefficients. For a layer, the indication may include a number of first TD coefficients for the layer and one or more indices of the TD domain coefficients for the layer. For example, a bitmap may be used to indicate the number of first TD coefficients and the indices of those first TD coefficients for a layer. In some aspects, 2LM bits may be used for this indication. In some aspects, this indication is transmitted in the second part of the two-part CSI.

In some aspects, a first number of first TD coefficients for a first layer is different from a second number of first TD coefficients for a second layer. In some aspects, a first number of first TD coefficients for a first layer is different from a second number of first TD coefficients for a second layer. In some aspects, a total number of first TD coefficients across all layers is equal to a reported total number of first TD coefficients across all layers. In some aspects, an average number of first TD coefficients per layer is equal to a reported average number of first TD coefficients per layer.

In some aspects, the first TD coefficients include compression bases used in the CSI compression for one or more layers. For example, if the UE 120 receives a layer configuration indicating 12 total compression bases across two layers, then the UE 120 may determine to use, for example, 4 compression bases to compress the first layer and 8 compression bases to compress the second layer. The UE 120 may report, to the base station 110, the allocation of 4 compression bases for the first layer and 8 compression bases for the second layer.

In a fifth operation 525, the base station 110 may configure one or more beams for the UE 120 based at least in part on the indicated RI value, the indicated number(s) of first TD coefficients per layer, the indicated number(s) of second TD coefficients per beam, and/or the like. For example, the UE 120 the two-part CSI may indicate first TD coefficients for each layer (for example, using the indicated number(s) of first TD coefficients for each layer) and second TD coefficients for each combination of beam and layer (for example, using the indicated number(s) of second TD coefficients for each combination of beam and layer), and the base station 110 may configure one or more beams and/or layers for the UE 120 based at least in part on the indicated first TD coefficients and the indicated second TD coefficients. By using two-part CSI with a fixed payload and a dynamic payload, the UE 120 can assist the base station 110 with properly interpreting the CSI, thereby leading to more accurate beam configuration.

Figure 6:
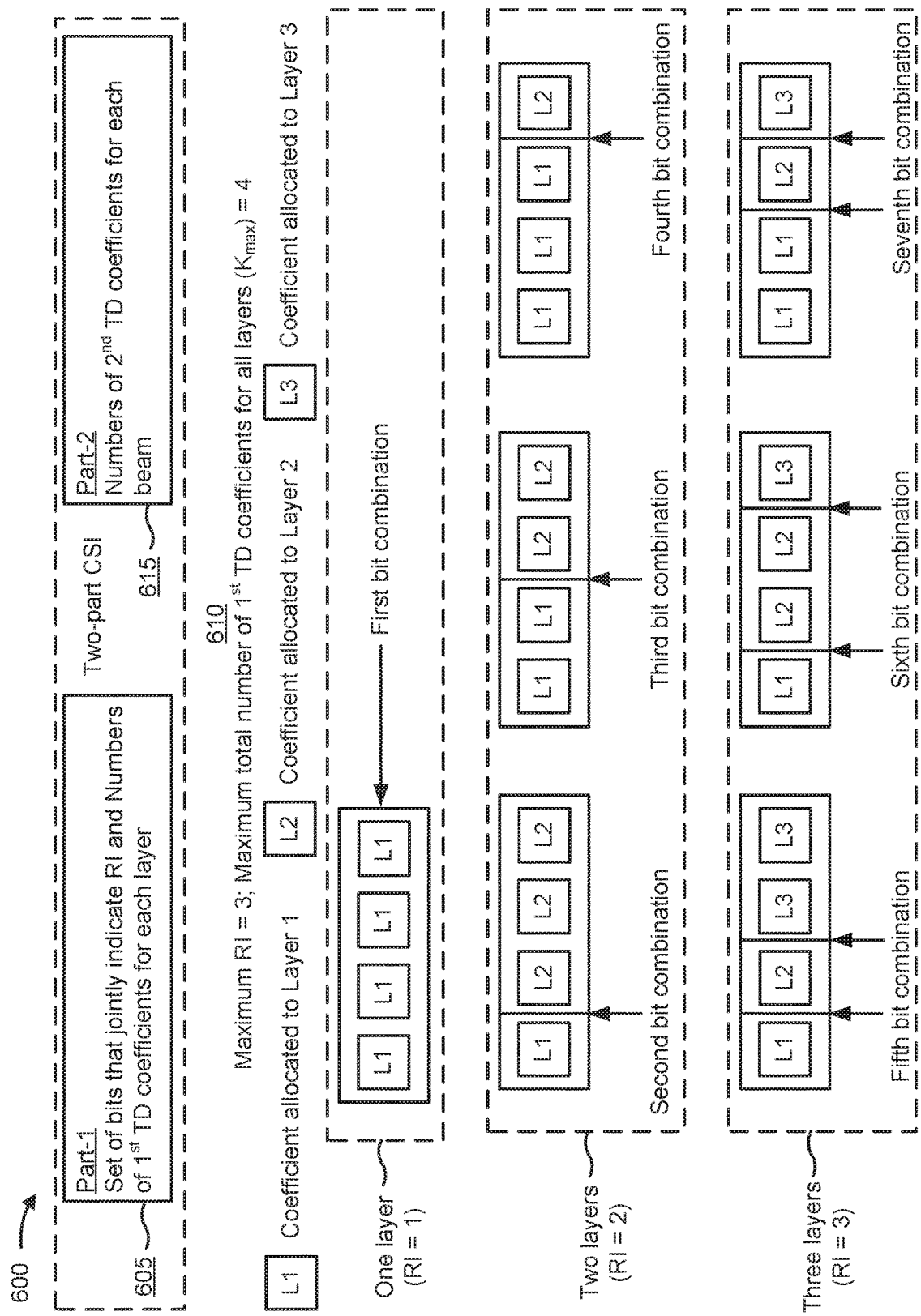

FIG. 6 is a diagram 600 illustrating an example of reporting rank indication and layer-specific coefficient quantities for Type II CSI compression using two-part CSI in accordance with various aspects of the present disclosure.

As shown in FIG. 6, in a first operation 605, the UE 120 may generate the first part of the two-part CSI to include a set of bits that jointly indicate an RI value and a set of numbers of first TD coefficients to be used to characterize compressed CSI for a corresponding set of layers. For example, the UE 120 may determine an RI value r based at least in part on a maximum RI value R and based at least in part on measuring CSI-RSs. The determined RI value may indicate a number of layers to be used by the UE 120, and the UE 120 may determine a number of first TD coefficients for each layer (for example, based at least in part on a TD coefficient matrix V, as described elsewhere herein). The UE 120 may jointly indicate the RI value and the number of coefficients for each layer using a set of bits, where a value of the set of bits indicates the RI value and the number of coefficients for each layer.

In some aspects, the first part of the two-part CSI may be designed to permit the UE 120 to indicate all possible RI values r (for example, from 1 to R, where $1 \le r \le R$) and all possible combinations of numbers of first TD coefficients for each layer. In some aspects, the possible combinations of numbers of first TD coefficients for each layer may depend on the maximum total number of first TD coefficients for all layers ($K_{max}$, where the sum of the numbers of first TD coefficients used for each layer cannot exceed $K_{max}$ or must be equal to $K_{max}$) and/or layer-specific maximum numbers of coefficients (for example, 2LM for one or more layers). Thus, different bit values may correspond to different RI values and/or different combinations of numbers of first TD coefficients for each layer.

In some aspects, a bit value reported by the UE 120 may indicate an allocation of $K_{max}$ to respective layers. For example, if $K_{max}$ equals three, then a first allocation may allocate one TD coefficient to a first layer and two first TD coefficients to a second layer, whereas a second allocation may allocate two first TD coefficients to the first layer and one TD coefficient to the second layer.

As another example, in a second operation 610, the UE 120 may determine that a maximum RI value R is equal to three and that $K_{max}$ is equal to four (which may be indicated by the base station 110). The UE 120 may then select a bit value corresponding to a selected RI value r and an allocation of $K_{max}$ to different layers for the selected RI value. For example, and as shown, the UE 120 may select a first bit combination (i.e., a first bit value for the set of bits) to indicate that the RI value is equal to one and that all of the maximum of four first TD coefficients are allocated to the first layer.

As further shown, the UE 120 may select a second bit combination to indicate that the RI value is equal to two, that one TD coefficient is allocated to the first layer, and that three first TD coefficients are allocated to the second layer. Similarly, the UE 120 may select a third bit combination to indicate that the RI value is equal to two, that two first TD coefficients are allocated to the first layer, and that two first TD coefficients are allocated to the second layer. Similarly, the UE 120 may select a fourth bit combination to indicate that the RI value is equal to two, that three first TD coefficients are allocated to the first layer, and that one TD coefficient is allocated to the second layer.

As further shown, the UE 120 may select a fifth bit combination to indicate that the RI value is equal to three, that one TD coefficient is allocated to the first layer, that one TD coefficient is allocated to the second layer, and that two first TD coefficients are allocated to the third layer. Similarly, the UE 120 may select a sixth bit combination to indicate that the RI value is equal to three, that one TD coefficient is allocated to the first layer, that two first TD coefficients are allocated to the second layer, and that one TD coefficient is allocated to the third layer. Similarly, the UE 120 may select a seventh bit combination to indicate that the RI value is equal to three, that two first TD coefficients are allocated to the first layer, that one TD coefficient is allocated to the second layer, and that one TD coefficient is allocated to the third layer.

In this case, three bits may be used in the first part of the two-part CSI to indicate the seven possible combinations. More generally, a length of the set of bits used to jointly indicate the RI value and the numbers of first TD coefficients for each layer may be equal to:

$$\left\lceil \log_2 \sum_{r=1}^{R} C_{K_{max}}^{r} \right\rceil$$

In other words, the length of the set of bits may be based at least in part on applying a ceiling function to a binary logarithm of a summation, across all selectable RI values r (from 1 to R), of a plurality of selectable allocations from a maximum total number of first transfer domain coefficients for all layers to respective numbers of first transfer domain coefficients for each layer ($C_{K\_max}^{r}$). Here, $C_{K\_max}^{r}$ may represent a number of possible allocations of $K_{max}$ for a particular layer r. In the example of FIG. 6, $C_{K\_max}^{r}$ equals one for layer one, equals three for layer two, and equals three for layer two. Thus, the sum of $C_{K\_max}^{r}$ across all layers is equal to 7, the binary logarithm of 7 is equal to about 2.8, and the ceiling of 2.8 is 3. Thus, three bits are required to jointly indicate the RI value and the numbers of first TD coefficients for each layer when the maximum RI value is 3 and $K_{max}$ is 4.

In some aspects, if the UE 120 is configured such that the total number of reported first TD coefficients for all layers ($K_{tot}$) is to be equal to the maximum total number of first TD coefficients across all layers ($K_{max}$), then a length of the set of bits used to jointly indicate the RI value and the numbers of first TD coefficients for each layer may be equal to:

$$\left\lceil \log_2 \sum_{r=1}^{R} C_{K_{max}}^{r-1} \right\rceil$$

In a third operation 615, the UE 120 may generate the second part of the two-part CSI to indicate, for each layer, a set of numbers of second TD coefficients to be used to characterize compressed CSI for a corresponding set of beams. Because the number of sets of reported second TD coefficients depends on the number of layers, the size of the second part of the two-part CSI may depend on the value reported for the set of bits in the first part of the two-part CSI. For example, the number of sets of reported second TD coefficients may be equal to the number of reported layers (for example, the reported RI value). In some aspects, each set of reported second TD coefficients may include one or more second TD coefficients for a corresponding one or more beams (where the number of beams 2L may be indicated by the base station 110).

In some aspects, a payload size of the second part of the two-part CSI (for example, a number of bits used to indicate the numbers of second TD coefficients) may be based at least in part on:

$$\left\lceil \log_2 \sum_{k_r=1}^{r} C_{2LM}^{K_r} \right\rceil$$

In other words, the payload size of the second part of the two-part CSI may be based at least in part on applying a ceiling function to a binary logarithm of a number of selectable options for numbers of second transfer domain coefficients across all layers. For example, the UE 120 may select, for a layer $k_r$ ($1 \le k_r \le r$), a number of coefficients $K_r$ from a maximum possible number of coefficient 2LM for the layer $k_r$. Here, $C_{2LM}^{K_r}$ may represent a number of possible allocations of 2LM coefficients to a number of coefficients $K_r$ for a particular layer $k_r$.

Using the techniques described herein in connection with FIG. 6, the UE 120 and/or the base station 110 may conserve resources (for example, memory resources, processing resources, and/or the like), as compared to other techniques described herein, due to lower complexity in indicating the RI value, the numbers of first TD coefficients, and the numbers of second TD coefficients in the two-part CSI and/or interpreting the two-part CSI to determine the RI value, the numbers of first TD coefficients, and the numbers of second TD coefficients. Furthermore, the techniques described herein in connection with FIG. 6 may be backward-compatible with legacy wireless communication systems and/or radio access technologies that use two-part CSI, thereby permitting a large number of UEs 120 and base stations 110 to implement such techniques.

Figure 7:
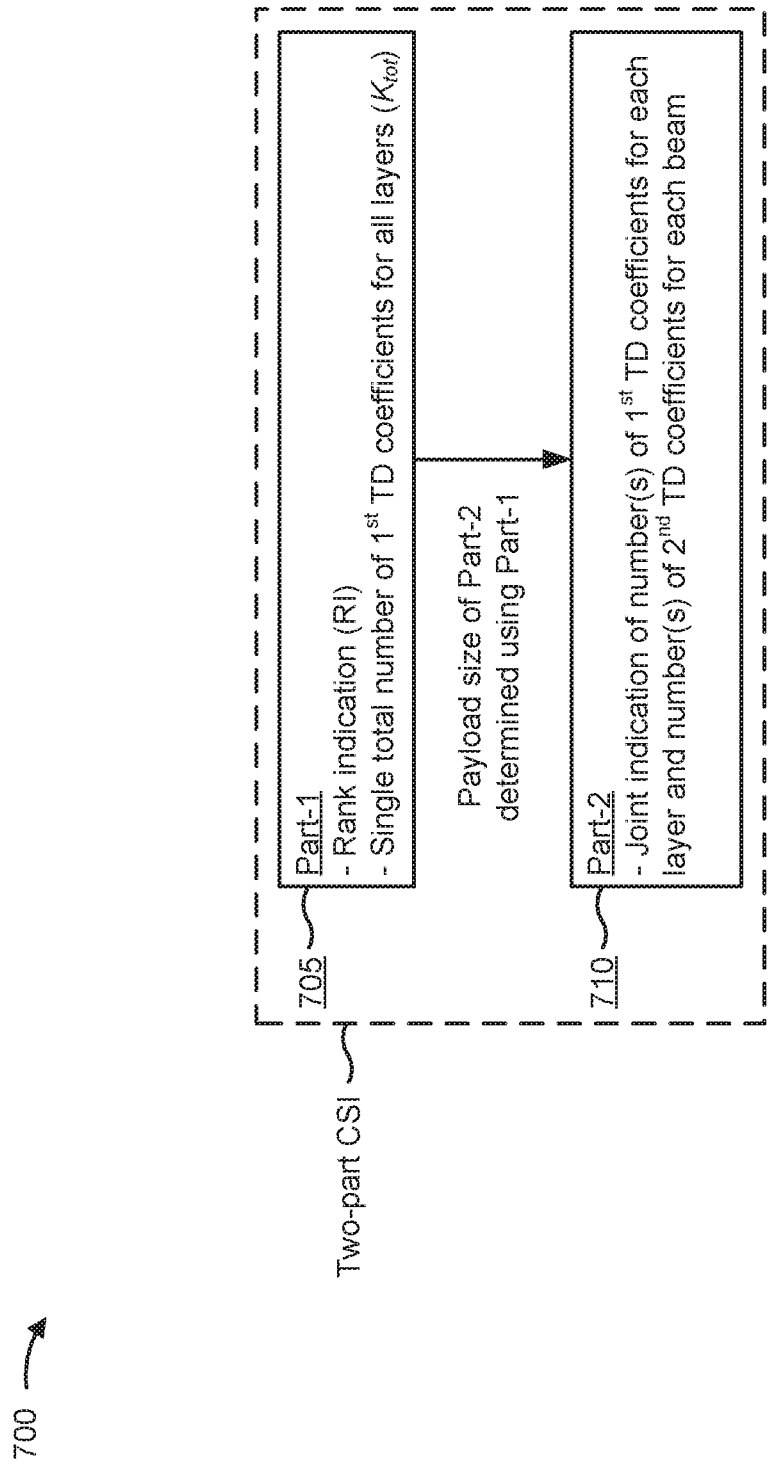

FIG. 7 is a diagram 700 illustrating an example of reporting rank indication and layer-specific coefficient quantities for Type II CSI compression using two-part CSI in accordance with various aspects of the present disclosure.

As shown in FIG. 7, in a first operation 705, the UE 120 may generate the first part of the two-part CSI to include a first set of bits that indicate an RI value and a second set of bits that indicate a single total number of first TD coefficients for all layers ($K_{tot}$). The single total number of first TD coefficients for all layers may represent a sum of the numbers of first TD coefficients used for each layer, such as a sum of a first number of first TD coefficients used for a first layer, a second number of first TD coefficients used for a second layer, and so on.

In some aspects, the first set of bits of the first part of the two-part CSI may be designed to permit the UE 120 to indicate all possible RI values r (for example, from 1 to R, where $1 \le r \le R$). Thus, a length of the first set of bits used to indicate the RI value may be equal to:

$$\lceil \log_2 R \rceil$$

In other words, the length of the first set of bits may be based at least in part on applying a ceiling function to a binary logarithm of a maximum RI value R configured for the UE 120.

In some aspects, the second set of bits of the first part of the two-part CSI may be designed to permit the UE 120 to indicate all possible values for $K_{tot}$, which may be less than or equal to $K_{max}$. Thus, a length of the second set of bits used to indicate the single total number of first TD coefficients for all layers ($K_{tot}$)e may be equal to:

$$\lceil \log_2 K_{max} \rceil$$

In other words, the length of the first set of bits may be based at least in part on applying a ceiling function to a binary logarithm of a maximum total number of first transfer domain coefficients for all layers. In some aspects, if the UE 120 is configured such that $K_{tot}$ is to be equal to $K_{max}$, then the UE 120 may exclude the value of $K_{tot}$ from the first part of the two-part CSI because this value would already be stored by the base station 110.

In a second operation 710, the UE 120 may generate the second part of the two-part CSI to jointly indicate (for example, using a joint set of bits) the numbers of first TD coefficients for each layer and the numbers of second TD coefficients for each combination of beam and layer. In some aspects, the second part of the two-part CSI may be designed to permit the UE 120 to indicate all possible combinations of numbers of first TD coefficients per layer and numbers of second TD coefficients per beam and layer. Such possible combinations may depend on the maximum total number of first TD coefficients for all layers ($K_{max}$), the single total number of first TD coefficients for all layers ($K_{tot}$), layer-specific maximum numbers of coefficients (for example, 2LM for one or more layers), and/or the like. Thus, different bit values for the joint set of bits may indicate different of numbers of first TD coefficients for each layer and/or different numbers of second TD coefficients for each beam for each layer.

Because the numbers of first TD coefficients and/or the numbers of second TD coefficients may vary, the size of the second part of the two-part CSI may depend on the values reported in the first part of the two-part CSI. For example, a size of the joint set of bits in the second part of the two-part CSI may be based at least in part on the RI value indicated in the first part of the two-part CSI and/or the single total number of first transfer domain coefficients for all layers ($K_{tot}$) indicated in the first part of the two-part CSI.

In some aspects, a payload size of the second part of the two-part CSI (for example, a number of bits used to indicate the numbers of first TD coefficients for each layer and the numbers of second TD coefficients for each combination of beam and layer) may be based at least in part on:

$$\lceil \log_2 C_{2LMr}^{K_{tot}} \rceil$$

In other words, the payload size of the second part of the two-part CSI may be based at least in part on applying a ceiling function to a binary logarithm of a number of possible selections of the single total number of first transfer domain coefficients for all layers from an overall number of coefficients permitted to be reported for each layer. For example, the UE 120 may select from 2LMr possible coefficients that can be selected for r layers (for example, assuming that 2LM is the same value for each layer). Out of these 2LMr possible coefficients, the UE 120 may select $K_{tot}$ coefficients to be reported. The total number of possible selections may be represented as $C_{2LMr}^{K_{tot}}$. In some aspects, when the number of possible coefficients per layer is layer-specific, $C_{2LMr}^{K_{tot}}$ may be determined as a sum of the number of possible coefficients for each layer.

Using the techniques described herein in connection with FIG. 7, the UE 120 and/or the base station 110 may use less overhead (for example, fewer network resources, such as time resources, frequency resources, and/or the like), as compared to other techniques described herein, due to a smaller payload size used to indicate the RI value, the numbers of first TD coefficients, and the numbers of second TD coefficients in the two-part CSI. Furthermore, the techniques described herein in connection with FIG. 7 may be backward-compatible with legacy wireless communication systems and/or radio access technologies that use two-part CSI, thereby permitting a large number of UEs 120 and base stations 110 to implement such techniques.

Figure 8:
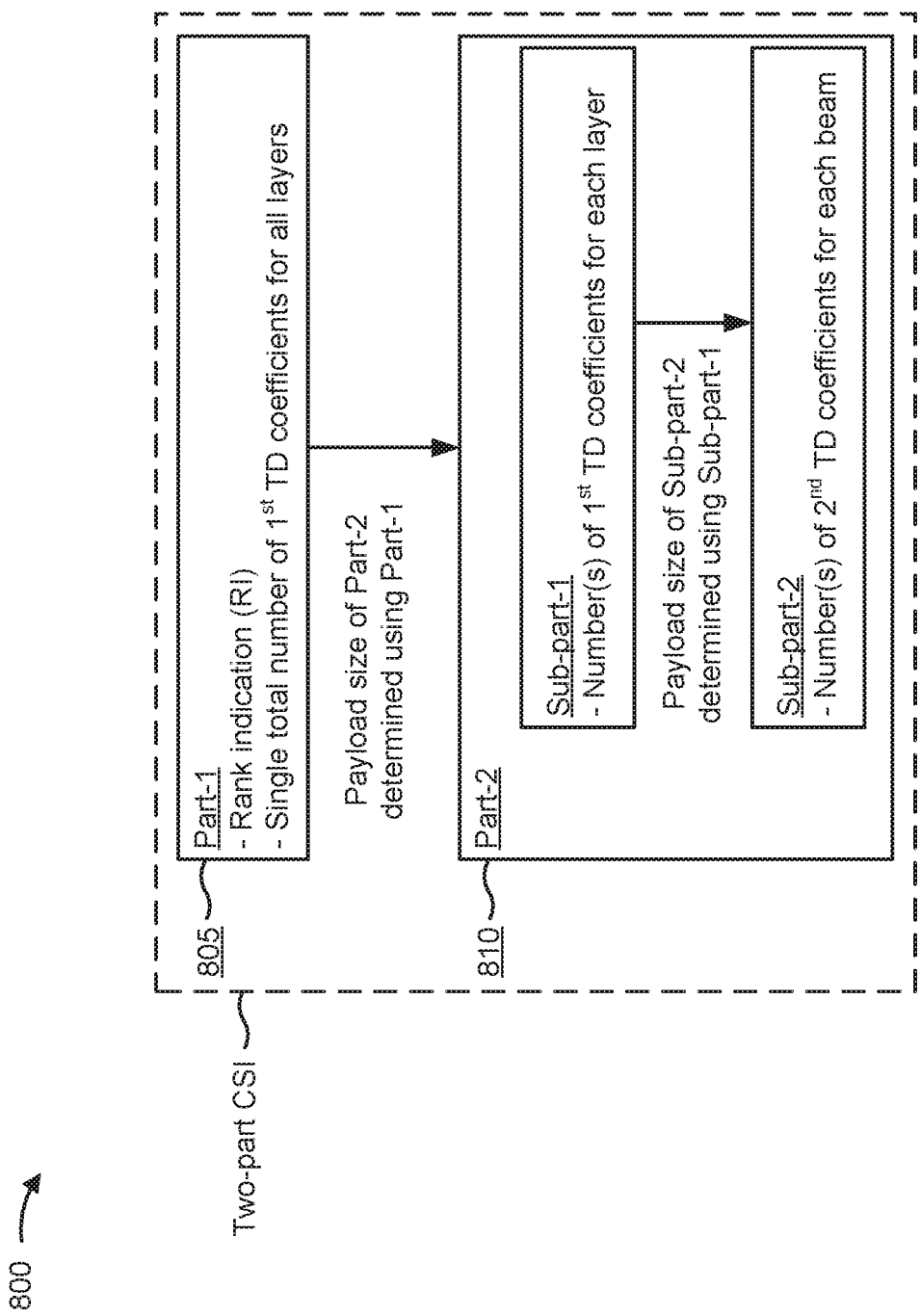

FIG. 8 is a diagram 800 illustrating an example of reporting rank indication and layer-specific coefficient quantities for Type II CSI compression using two-part CSI in accordance with various aspects of the present disclosure.

As shown in FIG. 8, in a first operation 805, the UE 120 may generate the first part of the two-part CSI to include a first set of bits that indicate an RI value and a second set of bits that indicate a single total number of first TD coefficients for all layers ($K_{tot}$), in a similar manner as described above in connection with FIG. 7. In some aspects, if the UE 120 is configured such that $K_{tot}$ is to be equal to $K_{max}$, then the UE 120 may exclude the value of $K_{tot}$ from the first part of the two-part CSI because this value would already be stored by the base station 110.

In a second operation 810, the UE 120 may generate the second part of the two-part CSI to include a first sub-part (shown as Sub-part-1) and a second sub-part (shown as Sub-part-2). As shown, the first sub-part may indicate the numbers of first TD coefficients for each layer, and the second sub-part may indicate the numbers of second TD coefficients per beam for each layer.

In some aspects, the first sub-part may be designed to permit the UE 120 to indicate all possible combinations of numbers of first TD coefficients for each layer. In some aspects, the possible combinations of numbers of first TD coefficients for each layer may depend on the single total number of first TD coefficients for all layers ($K_{tot}$) indicated in the first part of the two-part CSI. Thus, different bit values of the first sub-part may correspond to combinations of numbers of first TD coefficients for each layer.

In some aspects, a bit value reported by the UE 120 may indicate an allocation of $K_{tot}$ to respective layers. For example, if $K_{tot}$ equals three, then a first allocation may allocate one TD coefficient to a first layer and two first TD coefficients to a second layer, whereas a second allocation may allocate two first TD coefficients to the first layer and one TD coefficient to the second layer, in a similar manner as described in connection with $K_{max}$ in FIG. 6.

In some aspects, a length of the first sub-part (for example, used to indicate the numbers of first TD coefficients for each layer) may be determined based at least in part on:

$$\lceil \log_2 C_{K_{tot}}^r \rceil$$

In other words, the length of the first sub-part may be based at least in part on applying a ceiling function to a binary logarithm of a number of selectable allocations $C_{K_{tot}}^r$ from the single total number of first transfer domain coefficients for all layers ($K_{tot}$) to respective numbers of first transfer domain coefficients for each layer r. Thus, a payload size of the first sub-part (of the second part of the two-part CSI) may be based at least in part on an indication in the first part of the two-part CSI (for example, an indication of the number of layers r and/or the value of $K_{tot}$).

Additionally or alternatively, the UE 120 may use differential reporting to indicate the numbers of first TD coefficients for each layer (for example, in the first sub-part of the second part of the two-part CSI). Using differential reporting, the UE 120 may explicitly indicate a number of first TD coefficients to be used in a specific layer, referred to as a reference number of first TD coefficients for a reference layer. For each layer other than the reference layer, the UE 120 may indicate a relationship between the number of first TD coefficients to be used for that layer and either the reference number of first TD coefficients used for the reference layer or a number of first TD coefficients used for another layer (other than the reference layer and the layer for which the number of first TD coefficients is being determined). For example, the UE 120 may explicitly indicate a first number of first TD coefficients to be used for a first layer, may indicate a first offset from that first number to indicate a second number of first TD coefficients to be used for a second layer, may indicate a second offset from either the first number or the second number to indicate a third number of first TD coefficients to be used for a third layer, and so on. In this way, the UE 120 may conserve network resources by using less overhead to indicate the numbers of first TD coefficients for each layer.

In some aspects, the UE 120 may generate the second sub-part of the second part of the two-part CSI to indicate, for each layer, numbers of second TD coefficients for each beam. Because the numbers of reported second TD coefficients may depend on the number of layers and/or the numbers of first TD coefficients for each layer, the size of the second sub-part may depend on a value reported in the first part of the two-part CSI (for example, the reported RI value) and/or a value reported in the first sub-part of the second part of the two-part CSI (for example, the numbers of first TD coefficients for each layer).

In a similar manner as described above in connection with FIG. 6, a payload size of the second sub-part (for example, a number of bits used to indicate the numbers of second TD coefficients) may be based at least in part on:

$$\left\lceil \log_2 \sum_{k_r=1}^{r} C_{2LM}^{K_r} \right\rceil$$

In other words, the payload size of the second sub-part of the second part of the two-part CSI may be based at least in part on applying a ceiling function to a binary logarithm of a number of selectable options for numbers of second transfer domain coefficients across all layers. For example, the UE 120 may select, for a layer $k_r$ ($1 \le k_r \le r$), a number of coefficients $K_r$ from a maximum possible number of coefficients 2LM for the layer $k_r$. Here, $C_{2LM}^{K_r}$ may represent a number of possible allocations of 2LM coefficients to a number of coefficients $K_r$ for a particular layer $k_r$.

In the example of FIG. 8, the base station 110 may decode the first part of the two-part CSI, having the fixed size, and may explicitly or implicitly derive the payload size of the first sub-part of the second part of the two-part CSI based at least in part on the first part of the two-part CSI. The base station 110 may then decode the first sub-part, and may explicitly or implicitly derive the payload size of the second sub-part of the second part of the two-part CSI based at least in part on the first sub-part. In this way, the UE 120 may use the first part of the two-part CSI to indicate, to the base station 110, the size of the first sub-part of the second part of the two-part CSI, and may use the first sub-part of the second part of the two-part CSI to indicate, to the base station 110, the size of the second sub-part of the second part of the two-part CSI so that the base station 110 can properly interpret the two-part CSI.

Using the techniques described herein in connection with FIG. 8, the UE 120 and/or the base station 110 may use less overhead (for example, fewer network resources, such as time resources, frequency resources, and/or the like), as compared to other techniques described herein, due to a smaller payload size used to indicate the RI value, the numbers of first TD coefficients, and the numbers of second TD coefficients in the two-part CSI.

Figure 9:
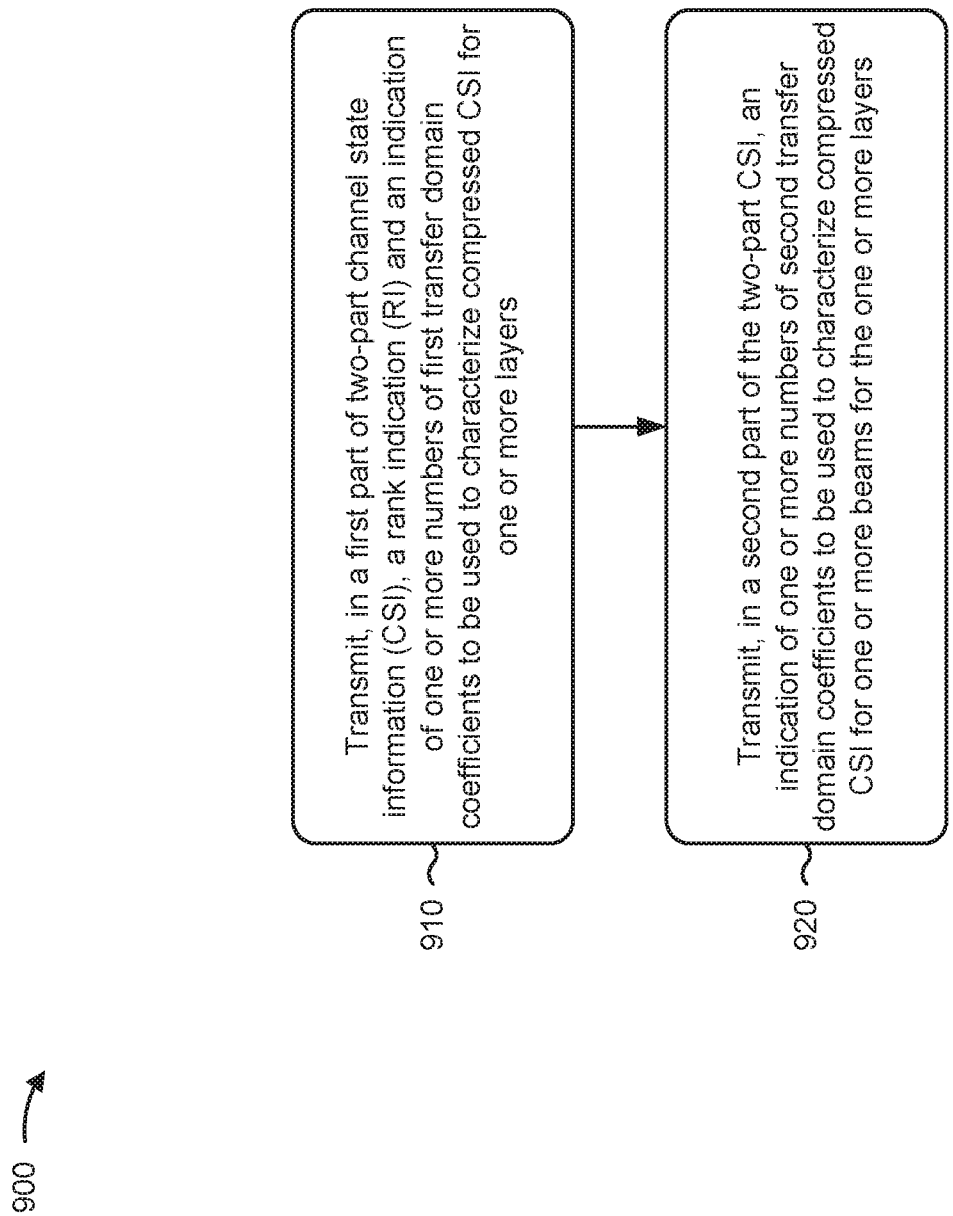
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (for example, UE 120 and/or the like) performs operations relating to reporting rank indication and layer-specific coefficient quantities for Type II CSI compression using two-part CSI.

As shown in FIG. 9, in some aspects, process 900 may include transmitting, in a first part of two-part channel state information (CSI), a rank indication (RI) and an indication of one or more numbers of first transfer domain coefficients to be used to characterize compressed CSI for one or more layers (block 910). For example, the UE (for example, using controller/processor 280, transmit processor 264, TX MIMO processor 266, MOD 254, antenna 252, and/or the like) may transmit, in a first part of two-part channel state information (CSI), a rank indication (RI) and an indication of one or more numbers of first transfer domain coefficients to be used to characterize compressed CSI for one or more layers, as described above.

As further shown in FIG. 9, in some aspects, process 900 may include transmitting, in a second part of the two-part CSI, an indication of one or more numbers of second transfer domain coefficients to be used to characterize compressed CSI for one or more beams for the one or more layers (block 920). For example, the UE (for example, using controller/processor 280, transmit processor 264, TX MIMO processor 266, MOD 254, antenna 252, and/or the like) may transmit, in a second part of the two-part CSI, an indication of one or more numbers of second transfer domain coefficients to be used to characterize compressed CSI for one or more beams for the one or more layers, as described above.

Process 900 may include additional aspects, such as any single aspect and/or any combination of aspects described below and/or in connection with one or more other processes described elsewhere herein.

In some aspects, a payload size of the second part of the two-part CSI is based at least in part on at least one of the RI or the one or more numbers of first transfer domain coefficients. In some aspects, process 900 includes receiving, from a base station, an indication of a maximum total number of first transfer domain coefficients permitted for all layers of the one or more layers collectively, wherein a determination of the one or more numbers of first transfer domain coefficients is based at least in part on the indication of the maximum total number of first transfer domain coefficients. In some aspects, process 900 includes receiving an indication that a total number of reported first transfer domain coefficients for all layers collectively is to be equal to the maximum total number of first transfer domain coefficients permitted for all layers of the one or more layers collectively. In some aspects, receiving the indication of the maximum total number of first transfer domain coefficients comprises receiving an indication of a configured number of first transfer domain coefficients for each layer of the one or more layers, wherein the maximum total number of first transfer domain coefficients is based at least in part on the configured number of first transfer domain coefficients for each layer.

In some aspects, process 900 includes transmitting an indication of a total number of first transfer domain coefficients reported by the UE for all layers collectively, wherein the total number of first transfer domain coefficients is less than or equal to the maximum total number of first transfer domain coefficients. In some aspects, the indication of the total number of first transfer domain coefficients comprises one or more bits, wherein a length of the one or more bits is based on at least one of the maximum total number of coefficients, a configured number of first transfer domain coefficients for each layer, or a maximum RI.

In some aspects, process 900 includes transmitting an indication of an average number of first transfer domain coefficients per layer, wherein the average number of first transfer domain coefficients per layer is less than or equal to a configured number of first transfer domain coefficients per layer. In some aspects, the indication of the average number of first transfer domain coefficients per layer comprises one or more bits, wherein a length of the one or more bits is based on at least one of the maximum total number of first transfer domain coefficients, the configured number of first transfer domain coefficients per layer, or a maximum RI.

In some aspects, the one or more layers include a plurality of layers and wherein the method further comprises transmitting, for each layer of the plurality of layers, an indication of the first transfer domain coefficients, wherein the indication comprises a number of first transfer domain coefficients for the layer and one or more indices of the first transfer domain coefficients for the layer. In some aspects, the indication of the first transfer domain coefficients is transmitted in the second part of the two-part CSI. In some aspects, a first number of first transfer domain coefficients for a first layer is different from a second number of first transfer domain coefficients for a second layer. In some aspects, a first number of first transfer domain coefficients for a first layer is different from a second number of first transfer domain coefficients for a second layer. In some aspects, a total number of first transfer domain coefficients across all layers is equal to a reported total number of first transfer domain coefficients across all layers. In some aspects, an average number of first transfer domain coefficients per layer is equal to a reported average number of first transfer domain coefficients per layer.

In some aspects, the first transfer domain coefficients include compression bases used in the CSI compression for one or more layers. In some aspects, process 900 includes receiving, from a base station, an indication of a maximum number of first transfer domain coefficients permitted for each of the one or more layers individually, wherein a determination of the one or more numbers of first transfer domain coefficients is based at least in part on the indication of the maximum number of first transfer domain coefficients permitted for each of the one or more layers individually. In some aspects, the maximum number of first transfer domain coefficients for a layer, of the one or more layers, is based at least in part on a number of spatial beams for the layer and a number of transfer domain bases for the layer.

In some aspects, the one or more layers include a plurality of layers and wherein the one or more numbers of first transfer domain coefficients include a plurality of numbers of first transfer domain coefficients, each number of first transfer domain coefficients of the plurality of numbers of first transfer domain coefficients to be used to characterize compressed CSI for a respective layer of the plurality of layers. In some aspects, the first part of the two-part CSI includes a set of bits that jointly indicate the RI and the plurality of numbers of first transfer domain coefficients. In some aspects, a reported value of the set of bits indicates, for each layer of the plurality of layers, an allocation of a number of first transfer domain coefficients from a maximum total number of first transfer domain coefficients permitted for all layers of the plurality of layers collectively. In some aspects, process 900 includes determining a payload size of the second part of the two-part CSI based at least in part on the reported value. In some aspects, a length of the set of bits is based at least in part on an application of a ceiling function to a binary logarithm of a summation, across all selectable RI values, of a plurality of selectable allocations of numbers of first transfer domain coefficients for each layer of the plurality of layers, each of the selectable allocations being from a maximum total number of first transfer domain coefficients permitted for all of the plurality of layers collectively. In some aspects, the one or more numbers of second transfer domain coefficients include, for each layer of the plurality of layers, a respective set of numbers of second transfer domain coefficients for a corresponding set of beams for the layer. In some aspects, process 900 includes determining a payload size of the second part of the two-part CSI based at least in part on an application of a ceiling function to a binary logarithm of a number of selectable options for numbers of second transfer domain coefficients permitted across all layers of the plurality of layers collectively.

In some aspects, the one or more numbers of first transfer domain coefficients include only a single total number of first transfer domain coefficients permitted for all layers of the one or more layers collectively. In some aspects, the first part of the two-part CSI includes a first set of bits that indicate the RI and a second set of bits that indicate the single total number of first transfer domain coefficients for all layers of the one or more layers collectively. In some aspects, process 900 includes determining a length of the first set of bits based at least in part on an application of a ceiling function to a binary logarithm of a maximum RI value configured for the UE. In some aspects, process 900 includes determining a length of the second set of bits based at least in part on an application of a ceiling function to a binary logarithm of a maximum total number of first transfer domain coefficients permitted for all layers of the one or more layers collectively. In some aspects, the one or more numbers of first transfer domain coefficients include a plurality of numbers of first transfer domain coefficients, wherein the one or more layers include a plurality of layers, and wherein the second part of the two-part CSI includes a joint indication of: the numbers of first transfer domain coefficients of the plurality of numbers of first transfer domain coefficients to be used to characterize compressed CSI for the respective layers of the plurality of layers, and the one or more second transfer domain coefficients.

In some aspects, process 900 includes determining a payload size of the second part of the two-part CSI based at least in part on the RI and the single total number of first transfer domain coefficients permitted for all layers of the one or more layers collectively. In some aspects, process 900 includes determining a payload size of the second part of the two-part CSI based at least in part on an application of a ceiling function to a binary logarithm of a number of possible selections of the single total number of first transfer domain coefficients permitted for all layers from an overall number of coefficients permitted to be reported for each layer. In some aspects, the second part of the two-part CSI includes: a first sub-part that indicates a plurality of numbers of first transfer domain coefficients to be used to characterize compressed CSI for a corresponding plurality of layers, and a second sub-part that indicates the one or more second transfer domain coefficients, wherein a payload size of the second sub-part is determined based at least in part on the first sub-part.

In some aspects, the first sub-part indicates an allocation, to each layer of the plurality of layers, of a respective number of the first transfer domain coefficients from the single total number of first transfer domain coefficients for all layers of the plurality of layers. In some aspects, a length of the first sub-part is based at least in part on an application of a ceiling function to a binary logarithm of a number of selectable allocations of the first transfer domain coefficients, each of the selectable allocations being to a respective layer of the plurality of layers from the single total number of first transfer domain coefficients for all layers of the plurality of layers. In some aspects, the one or more numbers of second transfer domain coefficients include, for each layer of the plurality of layers, a respective set of numbers of second transfer domain coefficients for a corresponding set of beams for the layer. In some aspects, process 900 includes determining the payload size of the second sub-part based at least in part on an application of a ceiling function to a binary logarithm of a number of selectable options, each selectable option representing a possible number of second transfer domain coefficients permitted across all layers of the plurality of layers collectively. In some aspects, the first sub-part indicates the plurality of numbers of first transfer domain coefficients based at least in part on: an explicit indication of a reference number of first transfer domain coefficients to be used to characterize the compressed CSI for a reference layer, and for each layer other than the reference layer, an indication of a relationship between a number of first transfer domain coefficients to be used for the layer and either the reference number of first transfer domain coefficients or a number of first transfer domain coefficients for another layer.

In some aspects, process 900 includes determining a payload size of the second part of the two-part CSI based at least in part on a maximum total number of first transfer domain coefficients permitted for all layers configured for the UE. In some aspects, a number of transfer domain bases, used to determine a plurality of numbers of first transfer domain coefficients to be used to characterize compressed CSI for a corresponding plurality of layers, is layer-specific.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
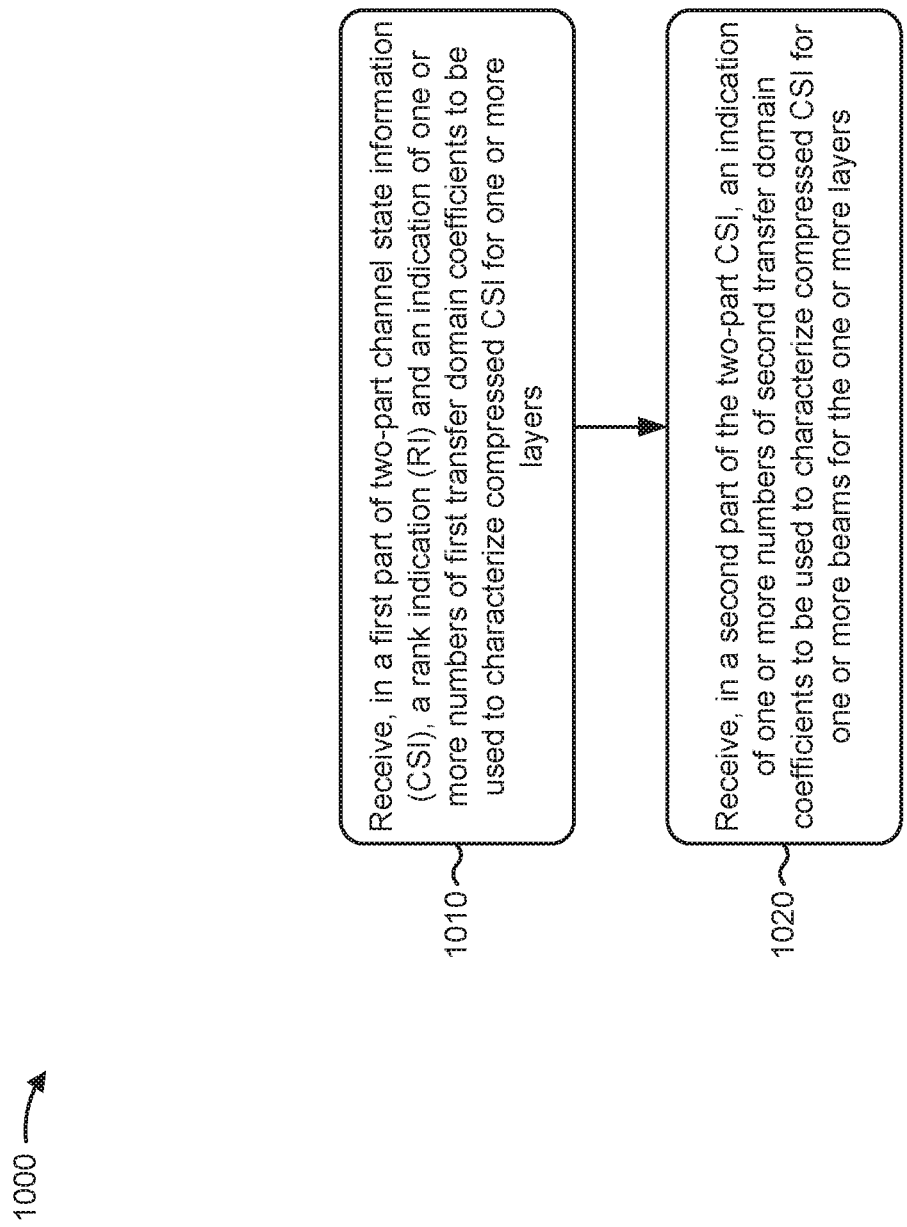
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 100 is an example where a base station (for example, base station 110 and/or the like) performs operations relating to receiving rank indication and layer-specific coefficient quantities for Type II CSI compression using two-part CSI.

As shown in FIG. 10, in some aspects, process 1000 may include receiving, in a first part of two-part channel state information (CSI), a rank indication (RI) and an indication of one or more numbers of first transfer domain coefficients to be used to characterize compressed CSI for one or more layers (block 1010). For example, the base station (for example, using antenna 234, DEMOD 232, MIMO detector 236, receive processor 238, controller/processor 240, and/or the like) may receive, in a first part of two-part CSI, an RI and an indication of one or more numbers of first transfer domain coefficients to be used to characterize compressed CSI for one or more layers, as described above.

As further shown in FIG. 10, in some aspects, process 1000 may include receiving, in a second part of the two-part CSI, an indication of one or more numbers of second transfer domain coefficients to be used to characterize compressed CSI for one or more beams for the one or more layers (block 1020). For example, the base station (for example, using antenna 234, DEMOD 232, MIMO detector 236, receive processor 238, controller/processor 240, and/or the like) may receive, in a second part of the two-part CSI, an indication of one or more numbers of second transfer domain coefficients to be used to characterize compressed CSI for one or more beams for the one or more layers, as described above.

Process 1000 may include additional aspects, such as any single aspect and/or any combination of aspects described below and/or in connection with one or more other processes described elsewhere herein.

In some aspects, process 1000 includes configuring one or more beams based at least in part on the RI, the one or more numbers of first transfer domain coefficients, and the one or more numbers of second transfer domain coefficients. In some aspects, a payload size of the second part of the two-part CSI is based at least in part on at least one of the RI or the one or more numbers of first transfer domain coefficients.

In some aspects, process 1000 includes transmitting an indication of a maximum total number of first transfer domain coefficients permitted for all layers of the one or more layers collectively, wherein the one or more numbers of first transfer domain coefficients is based at least in part on the indication of the maximum total number of first transfer domain coefficients. In some aspects, process 1000 includes transmitting an indication that a total number of reported first transfer domain coefficients for all layers collectively is to be equal to the maximum total number of first transfer domain coefficients permitted for all layers of the one or more layers collectively. In some aspects, transmitting the indication of the maximum total number of first transfer domain coefficients comprises transmitting an indication of a configured number of first transfer domain coefficients for each layer of the one or more layers, wherein the maximum total number of first transfer domain coefficients is based at least in part on the configured number of first transfer domain coefficients for each layer.

In some aspects, process 1000 includes receiving an indication of a total number of first transfer domain coefficients reported for all layers collectively, wherein the total number of first transfer domain coefficients is less than or equal to the maximum total number of first transfer domain coefficients. In some aspects, the indication of the total number of first transfer domain coefficients comprises one or more bits, wherein a length of the one or more bits is based on at least one of the maximum total number of coefficients, a configured number of first transfer domain coefficients for each layer, or a maximum RI.

In some aspects, process 1000 includes receiving an indication of an average number of first transfer domain coefficients per layer, wherein the average number of first transfer domain coefficients per layer is less than or equal to a configured number of first transfer domain coefficients per layer. In some aspects, the indication of the average number of first transfer domain coefficients per layer comprises one or more bits, wherein a length of the one or more bits is based on at least one of the maximum total number of first transfer domain coefficients, the configured number of first transfer domain coefficients per layer, or a maximum RI.

In some aspects, the one or more layers include a plurality of layers and wherein the method further comprises receiving, for each layer of the plurality of layers, an indication of the first transfer domain coefficients, wherein the indication comprises a number of first transfer domain coefficients for the layer and one or more indices of the first transfer domain coefficients for the layer. In some aspects, the indication of the first transfer domain coefficients is received in the second part of the two-part CSI. In some aspects, a first number of first transfer domain coefficients for a first layer is different from a second number of first transfer domain coefficients for a second layer. In some aspects, a first number of first transfer domain coefficients for a first layer is different from a second number of first transfer domain coefficients for a second layer. In some aspects, a total number of first transfer domain coefficients across all layers is equal to a reported total number of first transfer domain coefficients across all layers. In some aspects, an average number of first transfer domain coefficients per layer is equal to a reported average number of first transfer domain coefficients per layer.

In some aspects, the first transfer domain coefficients include compression bases used in the CSI compression for one or more layers. In some aspects, process 1000 includes transmitting an indication of a maximum number of first transfer domain coefficients permitted for each of the one or more layers individually, wherein the one or more numbers of first transfer domain coefficients is based at least in part on the indication of the maximum number of first transfer domain coefficients permitted for each of the one or more layers individually. In some aspects, the maximum number of first transfer domain coefficients for a layer, of the one or more layers, is based at least in part on a number of spatial beams for the layer and a number of transfer domain bases for the layer.

In some aspects, the one or more layers include a plurality of layers and wherein the one or more numbers of first transfer domain coefficients include a plurality of numbers of first transfer domain coefficients, each number of first transfer domain coefficients of the plurality of numbers of first transfer domain coefficients to be used to characterize compressed CSI for a respective layer of the plurality of layers. In some aspects, the first part of the two-part CSI includes a set of bits that jointly indicate the RI and the plurality of numbers of first transfer domain coefficients. In some aspects, a reported value of the set of bits indicates, for each layer of the plurality of layers, an allocation of a number of first transfer domain coefficients from a maximum total number of first transfer domain coefficients permitted for all layers of the plurality of layers collectively. In some aspects, process 1000 includes determining a payload size of the second part of the two-part CSI based at least in part on the reported value. In some aspects, a length of the set of bits is based at least in part on an application of a ceiling function to a binary logarithm of a summation, across all selectable RI values, of a plurality of selectable allocations of numbers of first transfer domain coefficients for each layer of the plurality of layers, each of the selectable allocations being from a maximum total number of first transfer domain coefficients permitted for all of the plurality of layers collectively. In some aspects, the one or more numbers of second transfer domain coefficients include, for each layer of the plurality of layers, a respective set of numbers of second transfer domain coefficients for a corresponding set of beams for the layer. In some aspects, process 1000 includes determining a payload size of the second part of the two-part CSI based at least in part on an application of a ceiling function to a binary logarithm of a number of selectable options for numbers of second transfer domain coefficients permitted across all layers of the plurality of layers collectively.

In some aspects, the one or more numbers of first transfer domain coefficients include only a single total number of first transfer domain coefficients permitted for all layers of the one or more layers collectively. In some aspects, the first part of the two-part CSI includes a first set of bits that indicate the RI and a second set of bits that indicate the single total number of first transfer domain coefficients for all layers of the one or more layers collectively. In some aspects, process 1000 includes determining a length of the first set of bits based at least in part on an application of a ceiling function to a binary logarithm of a maximum RI value configured for the UE. In some aspects, process 1000 includes determining a length of the second set of bits based at least in part on an application of a ceiling function to a binary logarithm of a maximum total number of first transfer domain coefficients permitted for all layers of the one or more layers collectively. In some aspects, the one or more numbers of first transfer domain coefficients include a plurality of numbers of first transfer domain coefficients, wherein the one or more layers include a plurality of layers, and wherein the second part of the two-part CSI includes a joint indication of: the numbers of first transfer domain coefficients of the plurality of numbers of first transfer domain coefficients to be used to characterize compressed CSI for the respective layers of the plurality of layers, and the one or more second transfer domain coefficients.

In some aspects, process 1000 includes determining a payload size of the second part of the two-part CSI based at least in part on the RI and the single total number of first transfer domain coefficients permitted for all layers of the one or more layers collectively. In some aspects, process 1000 includes determining a payload size of the second part of the two-part CSI based at least in part on an application of a ceiling function to a binary logarithm of a number of possible selections of the single total number of first transfer domain coefficients permitted for all layers from an overall number of coefficients permitted to be reported for each layer. In some aspects, the second part of the two-part CSI includes: a first sub-part that indicates a plurality of numbers of first transfer domain coefficients to be used to characterize compressed CSI for a corresponding plurality of layers, and a second sub-part that indicates the one or more second transfer domain coefficients, wherein a payload size of the second sub-part is determined based at least in part on the first sub-part.

In some aspects, the first sub-part indicates an allocation, to each layer of the plurality of layers, of a respective number of the first transfer domain coefficients from the single total number of first transfer domain coefficients for all layers of the plurality of layers. In some aspects, a length of the first sub-part is based at least in part on an application of a ceiling function to a binary logarithm of a number of selectable allocations of the first transfer domain coefficients, each of the selectable allocations being to a respective layer of the plurality of layers from the single total number of first transfer domain coefficients for all layers of the plurality of layers. In some aspects, the one or more numbers of second transfer domain coefficients include, for each layer of the plurality of layers, a respective set of numbers of second transfer domain coefficients for a corresponding set of beams for the layer. In some aspects, process 1000 includes determining the payload size of the second sub-part based at least in part on an application of a ceiling function to a binary logarithm of a number of selectable options, each selectable option representing a possible number of second transfer domain coefficients permitted across all layers of the plurality of layers collectively.

In some aspects, the first sub-part indicates the plurality of numbers of first transfer domain coefficients based at least in part on: an explicit indication of a reference number of first transfer domain coefficients to be used to characterize the compressed CSI for a reference layer, and for each layer other than the reference layer, an indication of a relationship between a number of first transfer domain coefficients to be used for the layer and either the reference number of first transfer domain coefficients or a number of first transfer domain coefficients for another layer.

In some aspects, process 1000 includes determining a payload size of the second part of the two-part CSI based at least in part on a maximum total number of first transfer domain coefficients permitted for all layers. In some aspects, a number of transfer domain bases, used to determine a plurality of numbers of first transfer domain coefficients to be used to characterize compressed CSI for a corresponding plurality of layers, is layer-specific.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
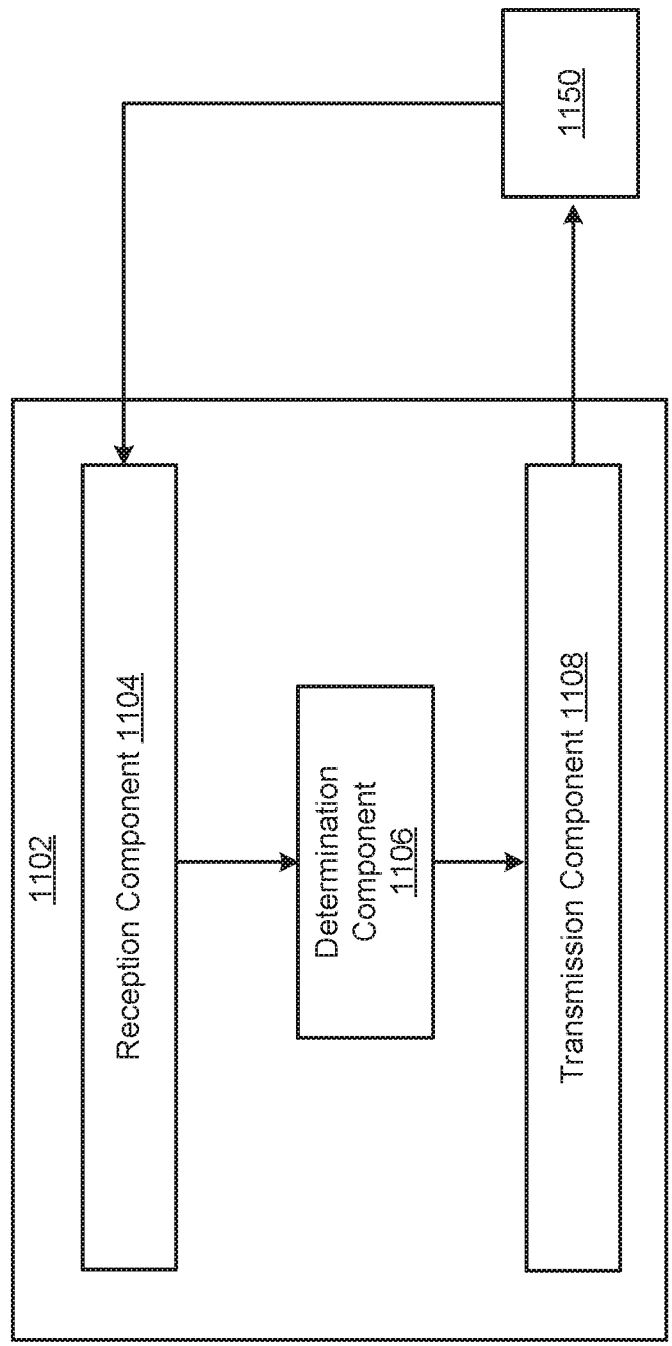
FIG. 11 is a conceptual data flow diagram illustrating the data flow between different components in an example apparatus, in accordance with various aspects of the present disclosure.

FIG. 11 is a conceptual data flow diagram 1100 illustrating the data flow between different components in an example apparatus 1102. The apparatus 1102 may be a UE. In some aspects, the apparatus 1102 includes a reception component 1104, a determination component 1106, a transmission component 1108, or a combination thereof, among other examples.

In some aspects, the reception component 1104 may receive, from an apparatus 1150 (such as a base station) a configuration for transmitting compressed CSI. Additionally or alternatively, the reception component 1104 may measure CSI-RS, which may be transmitted by the apparatus 1150. The determination component 1106 may determine (or calculate) CSI based at least in part on the measurements, the configuration, or a combination thereof. For example, the determination component 1106 may determine an RI, may determine one or more numbers of first transfer domain coefficients to be used to characterize compressed CSI for one or more layers, may determine one or more numbers of second transfer domain coefficients to be used to characterize compressed CSI for one or more beams for the one or more layers, or a combination thereof. The transmission component 1108 may transmit, in a first part of two-part CSI, the RI and the indication of one or more numbers of first transfer domain coefficients to be used to characterize compressed CSI for one or more layers. The transmission component 1108 may transmit, in a second part of the two-part CSI, an indication of one or more numbers of second transfer domain coefficients to be used to characterize compressed CSI for one or more beams for the one or more layers.

The apparatus may include additional components that perform each of the blocks of the algorithm in the aforementioned process 900 of FIG. 9, among other examples. For example, each block in the aforementioned process 900 of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

Figure 12:
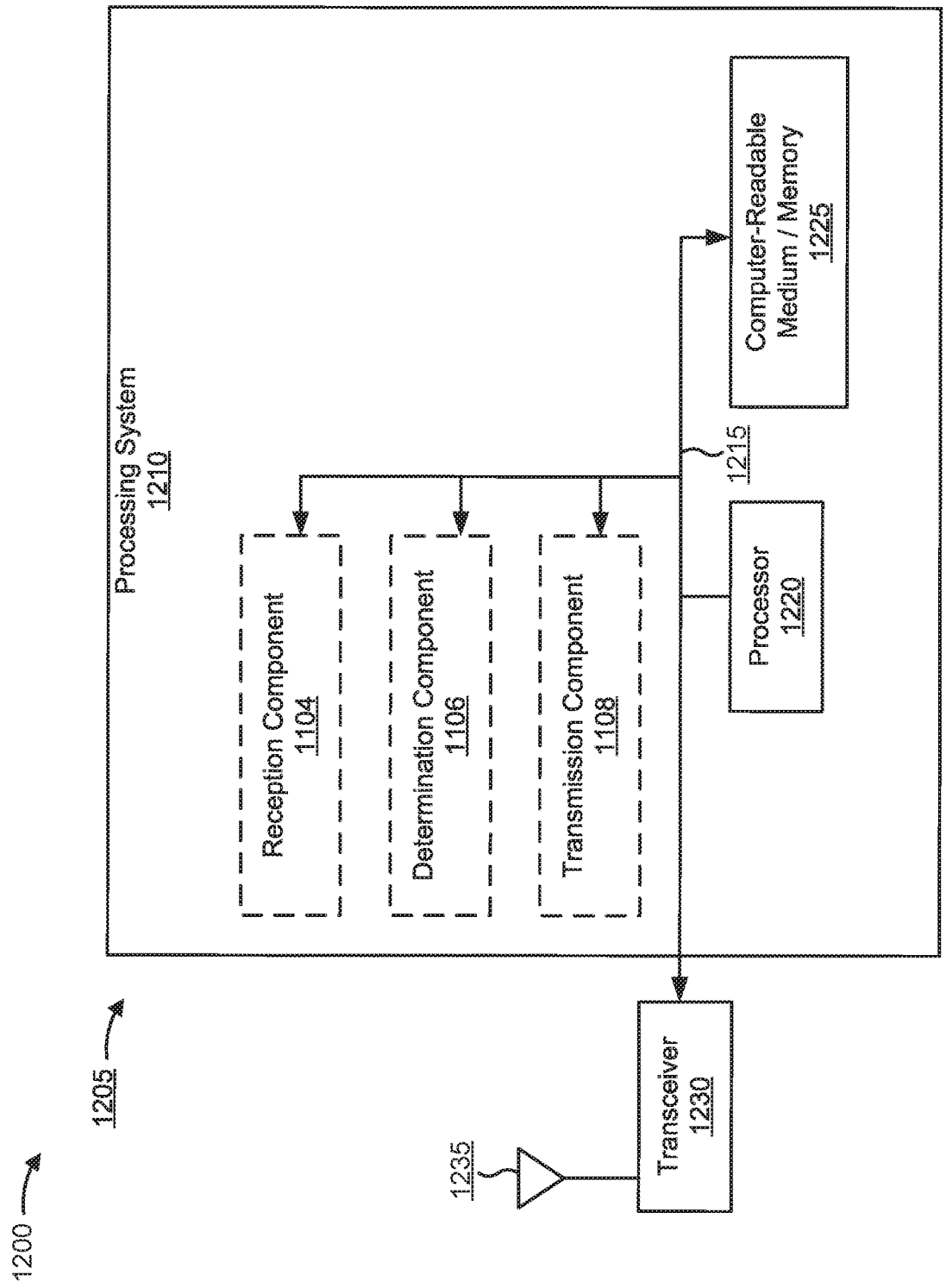
FIG. 12 is a diagram illustrating an example of a hardware implementation for an apparatus employing a processing system, in accordance with various aspects of the present disclosure.

FIG. 12 is a diagram 1200 illustrating an example of a hardware implementation for an apparatus 1205 employing a processing system 1210. The apparatus 1205 may be a UE.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the components 1104, 1106, and/or 1108, and the computer-readable medium/memory 1225. The bus 1215 may also link various other circuits such as timing sources, peripherals, voltage regulators, and power management circuits, which are well known in the art, and therefore will not be described any further.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1104. In addition, the transceiver 1230 receives information from the processing system 1210, specifically the transmission component 1108, and based at least in part on the received information, generates a signal to be applied to the one or more antennas 1235.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the components 1104, 1106, and/or 1108. The components may be software modules running in the processor 1220, resident/stored in the computer readable medium/memory 1225, one or more hardware modules coupled to the processor 1220, or some combination thereof.

In some aspects, the processing system 1210 may be a component of the UE 120 and may include the memory 282 and/or at least one of the TX MIMO processor 266, the RX processor 258, and/or the controller/processor 280. In some aspects, the apparatus 1205 for wireless communication includes means for transmitting, in a first part of two-part CSI, an RI and an indication of one or more numbers of first transfer domain coefficients to be used to characterize compressed CSI for one or more layers; means for transmitting, in a second part of the two-part CSI, an indication of one or more numbers of second transfer domain coefficients to be used to characterize compressed CSI for one or more beams for the one or more layers; among other examples. The aforementioned means may be one or more of the aforementioned components of the apparatus 1102 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
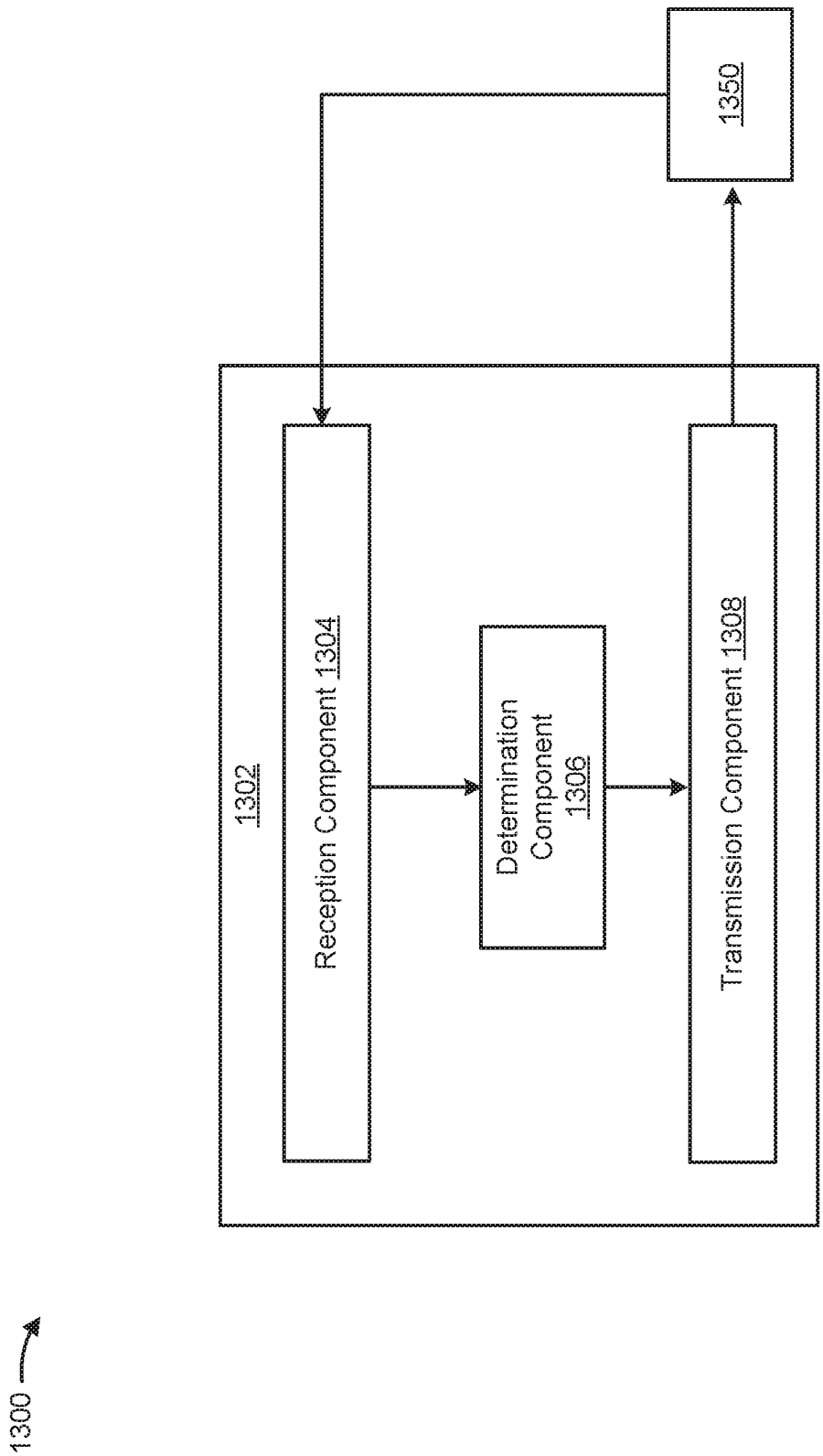
FIG. 13 is a conceptual data flow diagram illustrating the data flow between different components in an example apparatus, in accordance with various aspects of the present disclosure.

FIG. 13 is a conceptual data flow diagram 1300 illustrating the data flow between different components in an example apparatus 1302. The apparatus 1302 may be a base station. In some aspects, the apparatus 1302 includes a reception component 1304, a determination component 1306, a transmission component 1308, or a combination thereof, among other examples.

In some aspects, the transmission component 1308 may transmit, to an apparatus 1350 (such as a UE) a configuration for transmitting compressed CSI. Additionally or alternatively, the transmission component 1308 may transmit CSI-RS, which may be measured by the apparatus 1350. The reception component 1304 may receive, in a first part of two-part CSI, an RI and an indication of one or more numbers of first transfer domain coefficients to be used to characterize compressed CSI for one or more layers. The reception component 1304 may receive, in a second part of the two-part CSI, an indication of one or more numbers of second transfer domain coefficients to be used to characterize compressed CSI for one or more beams for the one or more layers. The determination component 1306 may determine CSI reported in the two-part CSI, and may use the reported CSI to configured future communications with the apparatus 1350, such as to select a modulation and coding scheme or to select a rank, among other examples.

The apparatus may include additional components that perform each of the blocks of the algorithm in the aforementioned process 1000 of FIG. 10, among other examples. For example, each block in the aforementioned process 1000 of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of components (e.g., one or more components) shown in FIG. 13 may perform one or more functions described as being performed by another set of components shown in FIG. 13.

Figure 14:
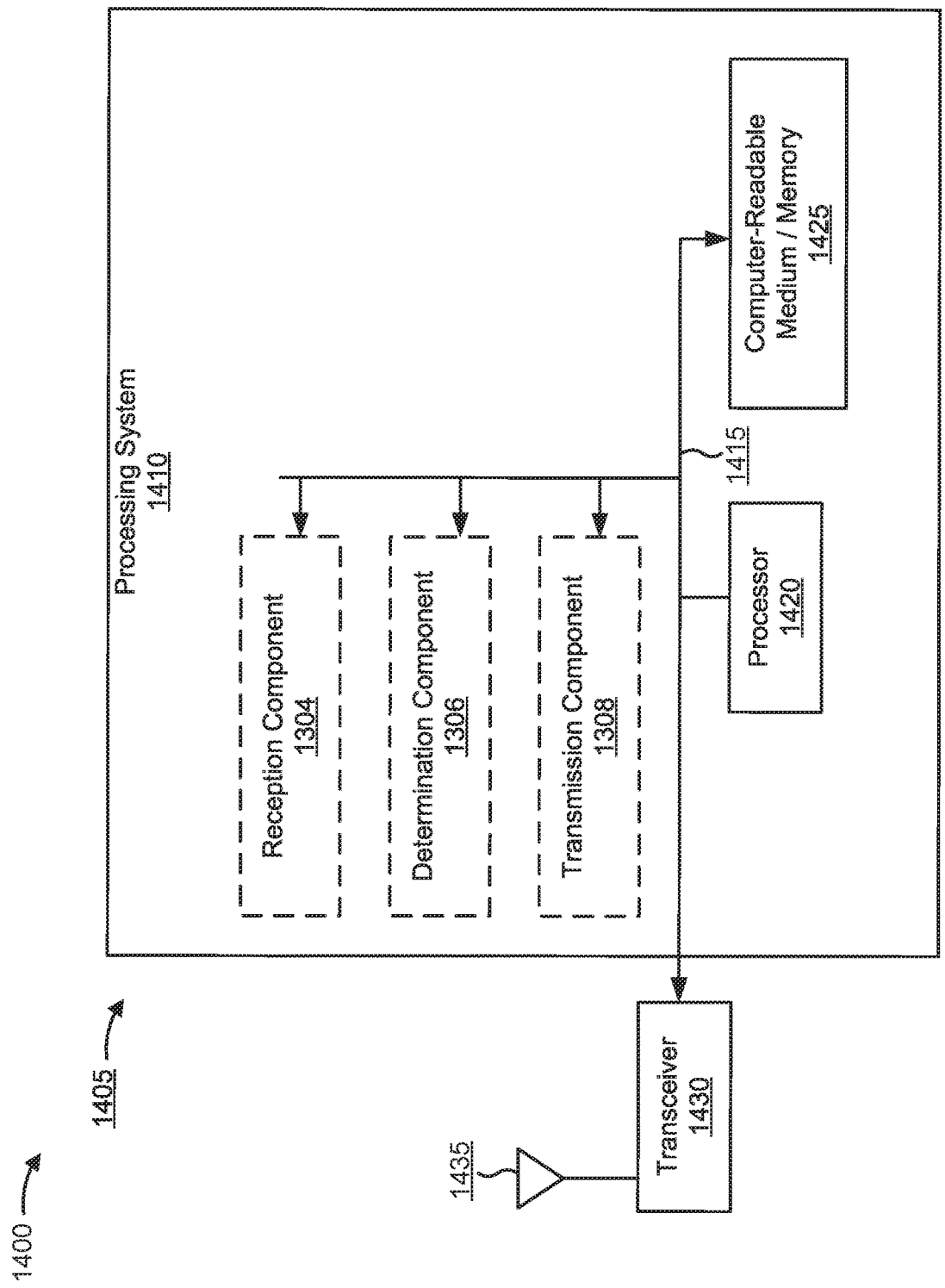
FIG. 14 is a diagram illustrating an example of a hardware implementation for an apparatus employing a processing system, in accordance with various aspects of the present disclosure.

FIG. 14 is a diagram 1400 illustrating an example of a hardware implementation for an apparatus 1405 employing a processing system 1410. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the components 1304, 1306, or 1308, among other examples, and the computer-readable medium/memory 1425. The bus 1415 may also link various other circuits such as timing sources, peripherals, voltage regulators, and power management circuits, which are well known in the art, and therefore will not be described any further.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1304. In addition, the transceiver 1430 receives information from the processing system 1410, specifically the transmission component 1308, and based at least in part on the received information, generates a signal to be applied to the one or more antennas 1435.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the components 1304, 1306, or 1308, among other examples. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the RX processor 238, and/or the controller/processor 240. In some aspects, the apparatus 1405 for wireless communication includes means for receiving, in a first part of two-part CSI, an RI and an indication of one or more numbers of first transfer domain coefficients to be used to characterize compressed CSI for one or more layers; means for receiving, in a second part of the two-part CSI, an indication of one or more numbers of second transfer domain coefficients to be used to characterize compressed CSI for one or more beams for the one or more layers; among other examples. The aforementioned means may be one or more of the aforementioned components of the apparatus 1302 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting, in a first part of two-part channel state information (CSI), a rank indication (RI) and an indication of one or more numbers of first coefficients to be used to characterize compressed CSI for one or more layers; and
   transmitting, in a second part of the two-part CSI, an indication of one or more numbers of second coefficients to be used to characterize compressed CSI for one or more beams for the one or more layers.

2. The method of claim 1, wherein a payload size of the second part of the two-part CSI is based at least in part on at least one of the RI or the one or more numbers of first coefficients.

3. The method of claim 1, further comprising receiving an indication of a single maximum total number of first coefficients permitted for all layers of the one or more layers collectively, the one or more numbers of first coefficients is associated with the indication of the single maximum total number of first coefficients.

4. The method of claim 3, further comprising receiving an indication that a total number of reported first coefficients for all layers collectively is to be equal to the single maximum total number of first coefficients permitted for all layers of the one or more layers collectively.

5. The method of claim 3,
   wherein receiving the indication of the single maximum total number of first coefficients comprises receiving an indication of a configured number of first coefficients,
   wherein the configured number applies to each individual layer of the one or more layers, and
   wherein the single maximum total number of first coefficients is based at least in part on the configured number.

6. The method of claim 3, further comprising transmitting an indication of a total number of first coefficients reported by the UE for all layers collectively,
   wherein the total number of first coefficients is less than or equal to the single maximum total number of first coefficients.

7. The method of claim 6,
   wherein the indication of the total number of first coefficients comprises one or more bits, and
   wherein a length of the one or more bits is based on at least one of the single maximum total number of first coefficients, a configured number of first transfer domain coefficients for each layer, or a maximum RI.

8. The method of claim 3, further comprising transmitting an indication of an average number of first coefficients per layer of the one or more layers,
   wherein the average number of first coefficients per layer is less than or equal to a configured number of first transfer domain coefficients per layer.

9. The method of claim 8,
   wherein the indication of the average number of first coefficients per layer comprises one or more bits, and
   wherein a length of the one or more bits is based on at least one of the single maximum total number of first coefficients, the configured number of first coefficients per layer, or a maximum RI.

10. The method of claim 1,
    wherein the one or more layers include a plurality of layers,
    wherein the method further comprises:
       transmitting, for each layer of the plurality of layers, an indication of first coefficients associated with the respective layer, and
    wherein the indication of the first coefficients associated with the respective layer comprises a number of first coefficients for the respective layer and one or more indices of the first coefficients for the respective layer.

11. The method of claim 10, wherein the indication, of the first coefficients associated with the respective layer, is transmitted in the second part of the two-part CSI.

12. The method of claim 1,
    wherein a first number of first coefficients for a first layer is different than a second number of first coefficients for a second layer,
    wherein the one or more numbers of first coefficients include the first number of first coefficients and the second number of first coefficients, and
    wherein the one or more layers include the first layer and the second layer.

13. The method of claim 1, wherein first coefficients, corresponding to the one or more numbers of first coefficients, include compression bases used in compressed CSI for the one or more layers.

14. The method of claim 1, further comprising receiving, from a base station, an indication of a maximum number of first coefficients permitted for each of the one or more layers individually,
    wherein a determination of the one or more numbers of first coefficients is based at least in part on the indication of the maximum number of first coefficients permitted for each of the one or more layers individually.

15. The method of claim 14, wherein the maximum number of coefficients for a layer, of the one or more layers, is based at least in part on a number of spatial beams for the layer and a number of transfer domain bases for the layer.

16. The method of claim 1, wherein the one or more numbers of first coefficients include only a single total number of first coefficients to be used to characterize compressed CSI for all layers of the one or more layers collectively.

17. The method of claim 16, wherein the first part of the two-part CSI includes a first set of bits that indicate the RI and a second set of bits that indicate the single total number of first coefficients for all layers of the one or more layers collectively.

18. The method of claim 17, further comprising at least one of:
determining a length of the first set of bits based at least in part on an application of a ceiling function to a binary logarithm of a maximum RI value configured for the UE,
determining a length of the second set of bits based at least in part on an application of a ceiling function to a binary logarithm of a maximum total number of first coefficients permitted for all layers of the one or more layers collectively, or
a combination thereof.

19. The method of claim 16, further comprising at least one of:
determining a payload size of the second part of the two-part CSI based at least in part on the RI and the single total number of first coefficients to be used to characterize compressed CSI for all layers of the one or more layers collectively, or
determining a payload size of the second part of the two-part CSI based at least in part on an application of a ceiling function to a binary logarithm of a number of possible selections of the single total number of first coefficients to be used to characterize compressed CSI for all layers from an overall number of coefficients permitted to be reported for each layer.

20. The method of claim 1,
wherein the second part of the two-part CSI includes:
a first sub-part that indicates a plurality of numbers of first coefficients to be used to characterize compressed CSI for a corresponding plurality of layers, and
a second sub-part that indicates the one or more numbers of second coefficients, and
wherein a payload size of the second sub-part is determined based at least in part on the first sub-part.

21. The method of claim 1,
wherein the one or more layers include a plurality of layers, and
wherein the one or more numbers of second coefficients include, for each layer of the plurality of layers, a respective set of numbers of second coefficients for a corresponding set of beams for the respective layer.

22. A method of wireless communication, comprising:
receiving, in a first part of two-part channel state information (CSI), a rank indication (RI) and an indication of one or more numbers of first coefficients to be used to characterize compressed CSI for one or more layers; and
receiving, in a second part of the two-part CSI, an indication of one or more numbers of second coefficients to be used to characterize compressed CSI for one or more beams for the one or more layers.

23. A user equipment (UE) for wireless communication, comprising:
one or more memories; and
one or more processors, coupled to the one or more memories, configured to:
transmit, in a first part of two-part channel state information (CSI), a rank indication (RI) and an indication of one or more numbers of first coefficients to be used to characterize compressed CSI for one or more layers; and
transmit, in a second part of the two-part CSI, an indication of one or more numbers of second coefficients to be used to characterize compressed CSI for one or more beams for the one or more layers.

24. The UE of claim 23, wherein a payload size of the second part of the two-part CSI is based at least in part on at least one of the RI or the one or more numbers of first coefficients.

25. The UE of claim 23,
wherein the one or more processors are further configured to:
receive an indication of a single maximum total number of first coefficients permitted for all layers of the one or more layers collectively, and
wherein the one or more numbers of first coefficients are associated with the indication of the single maximum total number of first coefficients.

26. The UE of claim 23,
wherein the one or more layers include a plurality of layers,
wherein the one or more processors are further configured to:
transmit, for each layer of the plurality of layers, an indication of first coefficients associated with the respective layer, and
wherein the indication of the first coefficients associated with the respective layer comprises a number of first coefficients for the respective layer and one or more indices of the first coefficients for the respective layer.

27. The UE of claim 26, wherein the indication, of the first coefficients associated with the respective layer, is a bitmap.

28. The UE of claim 26, wherein the indication, of the first coefficients associated with the respective layer, includes 2LM bits.

29. The UE of claim 26, wherein the indication, of the first coefficients associated with the respective layer, is transmitted in the second part of the two-part CSI.

30. The UE of claim 23,
wherein the one or more layers include a plurality of layers,
wherein the plurality of layers include a first layer and a second layer,
wherein a first number of first coefficients for the first layer is different than a second number of first coefficients for the second layer, and
wherein the one or more numbers of first coefficients include the first number of first coefficients and the second number of first coefficients.

31. The UE of claim 23,
wherein the one or more layers include a plurality of layers,
wherein the one or more numbers of first coefficients include a plurality of numbers for the plurality of layers, and
wherein a total number of coefficients for all layers of the plurality of layers is based on the plurality of numbers for the plurality of layers.

* * * * *